US007846983B2

(12) United States Patent
Kiefer et al.

(10) Patent No.: US 7,846,983 B2
(45) Date of Patent: *Dec. 7, 2010

(54) PROTON CONDUCTING ELECTROLYTE MEMBRANE FOR USE IN HIGH TEMPERATURES AND THE USE THEREOF IN FUEL CELLS

(75) Inventors: Joachim Kiefer, Losheim am See (DE); Oemer Uensal, Mainz (DE)

(73) Assignee: BASF Fuel Cell GmbH (DE)

( * ) Notice: Subject to any disclaimer, the term of this patent is extended or adjusted under 35 U.S.C. 154(b) by 394 days.

This patent is subject to a terminal disclaimer.

(21) Appl. No.: 10/506,880

(22) PCT Filed: Mar. 4, 2003

(86) PCT No.: PCT/EP03/02399

§ 371 (c)(1), (2), (4) Date: Dec. 8, 2004

(87) PCT Pub. No.: WO03/074596

PCT Pub. Date: Sep. 12, 2003

(65) Prior Publication Data

US 2005/0084727 A1    Apr. 21, 2005

(30) Foreign Application Priority Data

Mar. 5, 2002    (DE)    ................. 102 09 419

(51) Int. Cl.
*C08J 5/22* (2006.01)
*B01J 41/12* (2006.01)

(52) U.S. Cl. .......................... 521/30; 521/27
(58) Field of Classification Search .......... 521/27, 521/30
See application file for complete search history.

(56) References Cited

U.S. PATENT DOCUMENTS

| | | | |
|---|---|---|---|
| 3,224,908 A | 12/1965 | Duch et al. | |
| 3,293,088 A | 12/1966 | Herbst et al. | |
| 3,313,783 A | 4/1967 | Iwakura et al. | |
| 3,737,045 A | 6/1973 | Hasimoto et al. | |
| 3,808,305 A | 4/1974 | Gregor | |
| 4,012,303 A | 3/1977 | D'Agostino et al. | |
| 4,075,093 A | 2/1978 | Walch et al. | |
| 4,187,333 A | 2/1980 | Rembaum et al. | |
| 4,537,668 A | 8/1985 | Gaussens et al. | |
| 4,622,276 A | 11/1986 | Walsh | |
| 4,634,530 A | 1/1987 | Kuder et al. | |
| 5,098,985 A | 3/1992 | Harris et al. | |
| 5,211,984 A | 5/1993 | Wilson | |
| 5,218,076 A | 6/1993 | Madison et al. | |
| 5,312,895 A | 5/1994 | Dang et al. | |
| 5,492,996 A | 2/1996 | Dang et al. | |
| 5,599,639 A | 2/1997 | Neoya et al. | |
| 5,633,337 A | 5/1997 | Tan et al. | |
| 5,643,968 A * | 7/1997 | Andreola et al. | .............. 521/27 |
| 5,656,386 A | 8/1997 | Scherer et al. | |
| 5,674,969 A | 10/1997 | Sikkema et al. | |
| 6,030,718 A | 2/2000 | Fuglevand et al. | |
| 6,087,032 A | 7/2000 | Yoshitake et al. | |
| 6,096,369 A | 8/2000 | Anders et al. | |
| 6,110,616 A | 8/2000 | Sheikh-Ali et al. | |
| 6,197,147 B1 | 3/2001 | Bönsel et al. | |
| 6,248,469 B1 | 6/2001 | Formato et al. | |
| 6,264,857 B1 | 7/2001 | Kreuer et al. | |
| 6,368,587 B1 | 4/2002 | Anders et al. | |
| 6,607,856 B2 * | 8/2003 | Suzuki et al. | ................. 429/30 |
| 7,235,320 B2 | 6/2007 | Calundann et al. | |
| 2001/0038937 A1 | 11/2001 | Suzuki et al. | |
| 2002/0015879 A1 | 2/2002 | Gascoyne et al. | |
| 2002/0045085 A1 | 4/2002 | Formato et al. | |
| 2003/0012988 A1 | 1/2003 | Gascoyne et al. | |
| 2003/0031909 A1 | 2/2003 | Gascoyne et al. | |
| 2004/0096734 A1 | 5/2004 | Calundann et al. | |
| 2004/0101731 A1 | 5/2004 | Jakoby et al. | |
| 2004/0127588 A1 | 7/2004 | Calumdann et al. | |
| 2004/0131909 A1 | 7/2004 | Soczka-Guth et al. | |
| 2004/0247974 A1 | 12/2004 | Uensal | |
| 2005/0053820 A1 | 3/2005 | Calundann et al. | |
| 2005/0118477 A1 | 6/2005 | Kiefer et al. | |
| 2005/0118478 A1 | 6/2005 | Kiefer et al. | |

(Continued)

FOREIGN PATENT DOCUMENTS

CA    2 491 239 A1    1/2004

(Continued)

OTHER PUBLICATIONS

Zouahri et al. European Polymer Journal, 38 (2002), 2247-2254.*

(Continued)

*Primary Examiner*—Helen L. Pezzuto
(74) *Attorney, Agent, or Firm*—Connolly Bove Lodge & Hutz LLP

(57) ABSTRACT

The present invention concerns a proton-conducting electrolyte membrane obtainable by a method comprising the following steps:
A) expanding a polymer film with a liquid that contains a vinyl-containing phosphonic acid, and
B) polymerisation of the vinyl-containing phosphonic acid present in the liquid introduced in step A).

An inventive membrane, thanks to its exceptional chemical and thermal properties, is very versatile in its use and is particularly suitable as a polymer-electrolyte-membrane (PEM) in so-called PEM fuel cells.

9 Claims, No Drawings

U.S. PATENT DOCUMENTS

| | | |
|---|---|---|
| 2005/0147859 A1 | 7/2005 | Kiefer et al. |
| 2006/0210881 A1 | 9/2006 | Calundann et al. |
| 2007/0292734 A1 | 12/2007 | Kiefer et al. |

FOREIGN PATENT DOCUMENTS

| | | |
|---|---|---|
| CA | 2 496 589 A1 | 3/2004 |
| CA | 2 498 370 A1 | 4/2004 |
| DE | 1 301 578 | 8/1969 |
| DE | 196 53 484 A 1 | 6/1998 |
| DE | 101 48 131 A1 | 5/2003 |
| EP | 0 265 921 A2 | 5/1988 |
| EP | 0 265 921 A3 | 5/1988 |
| EP | 0 476 560 A1 | 9/1991 |
| EP | 0 846 733 A2 | 6/1998 |
| EP | 0 893 165 A2 | 1/1999 |
| EP | 1 110 992 A1 | 6/2001 |
| EP | 1 202 365 A1 | 5/2002 |
| EP | 1354907 A1 | 10/2003 |
| JP | 53-97988 | 8/1978 |
| JP | 2002146014 | 5/2002 |
| JP | 2003022709 | 1/2003 |
| WO | WO 94/25506 | 11/1994 |
| WO | WO 99/10165 | 3/1999 |
| WO | WO 00/49069 | 8/2000 |
| WO | WO 00/54351 | 9/2000 |
| WO | WO 01/45192 A1 | 6/2001 |
| WO | WO 01/94450 A2 | 12/2001 |
| WO | WO 02/36249 A1 | 5/2002 |
| WO | WO 02/38650 A1 | 5/2002 |
| WO | WO 02/071518 A1 | 9/2002 |
| WO | WO 02/081547 A1 | 10/2002 |
| WO | WO 02/088219 A1 | 11/2002 |
| WO | WO 02/102881 A1 | 12/2002 |
| WO | WO 03/007411 A2 | 1/2003 |
| WO | WO 03/022412 A2 | 3/2003 |
| WO | WO 03/022412 A3 | 3/2003 |

OTHER PUBLICATIONS

Osaheni, J.A. and Jenekhe, S.A., "Synethesis of Processing of Heterocyclic Polymers as Electronic, Optoelectronic, and Nonlinear Optical Materials. 4. New Conjugated Rigid-Rod Poly(benzobis(imidazole))s," *Macomolecules* 28:1172-1179 (1995).

Y. Sakaguchi, et al., "Preparation and Properties of Sulfonated or Phosphonated Polybenzimidazoles and Polybenzoxazoles," *Am. Chem. Soc., Polymeric Materials Science and Engineering*, 84: 899-900 (2001).

Spry, R. J., et al. Anisotropic Ionic Conductivity of Lithium-Doped Sulfonated PBI, *J. of Polymer Sci.: Part B: Polymer Physics*, 35: 2925-2933 (1997).

Office Action made Final from U.S. Appl. No. 10/506,646, dated Jun. 22, 2009.

Office Action from U.S. Appl. No. 10/506,622, dated Jun. 28, 2007.
Office Action made Final from U.S. Appl. No. 10/506,622, dated Feb. 14, 2008.
Office Action from U.S. Appl. No. 10/506,622, dated Sep. 11, 2008.
Office Action made Final from U.S. Appl. No. 10/506,622, dated Apr. 14, 2009.
Advisory Action from U.S. Appl. No. 10/506,622, dated Jun. 19, 2009.
Office Action from U.S. Appl. No. 10/506,387, dated Jul. 2, 2007.
Office Action made Final from U.S. Appl. No. 10/506,387, dated May 5, 2008.
Office Action from U.S. Appl. No. 10/506,387, dated Sep. 11, 2008.
Office Action made Final from U.S. Appl. No. 10/506,387, dated Apr. 13, 2009.
Advisory Action from U.S. Appl. No. 10/506,387, dated Jun. 22, 2009.
Nov. 12, 2008, Office Action, U.S. Appl. No. 10/506,646.

\* cited by examiner

PROTON CONDUCTING ELECTROLYTE MEMBRANE FOR USE IN HIGH TEMPERATURES AND THE USE THEREOF IN FUEL CELLS

RELATED APPLICATIONS

This application is the U.S. National Stage of International Application No. PCT/EP03/02399, filed 4 Mar. 2003, published in German, and claims priority under 35 U.S.C. §119 or 365 to German Application No. 102 09 419.5, filed 5 Mar. 2002.

The present invention concerns a proton-conducting electrolyte membrane for high temperature applications with a polyvinyl phosphonic acid base, which thanks to its exceptional chemical and thermal properties is very versatile in its use and is particularly suitable as a polymer-electrolyte-membrane (PEM) in so-called PEM fuel cells.

A fuel cell normally contains an electrolyte and two electrodes separated by the electrolyte. In the case of a fuel cell one of the two electrodes is supplied with a fuel, such as hydrogen gas or a methanol-water mixture, and the other electrode is supplied with an oxidizing agent, such as oxygen gas or air, and in this way chemical energy from the fuel oxidation is converted directly into electrical energy. During the oxidation reaction protons and electrons are formed.

The electrolyte is permeable to hydrogen ions, i.e. protons, but not to reactive fuel such as the hydrogen gas or methanol and the oxygen.

A fuel cell generally has several individual cells, so-called MEAs (Membrane-electrode assemblies), which each contain an electrolyte and two electrodes separated by the electrolyte.

As the electrolyte for the fuel cell solid matter such as polymer electrolyte membranes or liquids such as phosphoric acid are used. Recently the use of polymer electrolyte membranes as the electrolyte for fuel cells has been attracting attention. Basically, two different categories of polymer membranes can be identified.

The first category includes cation exchanger membranes comprising a polymer matrix, which contains covalently bonded acid groups, preferably sulphonic acid groups. The sulphonic acid group changes into an anion giving of a hydrogen ion and therefore conducts protons. Here, the mobility of the proton and thus the proton conductivity is directly linked to the water content. Because of the very good miscibility of methanol and water such cation exchanger membranes have a high methanol permeability and are therefore unsuitable for applications in a direct methanol fuel cell. If the membrane dries out, i.e. as a result of high temperature, then the conductivity of the membrane and accordingly the performance of the fuel cell drop dramatically. The operating temperatures of fuel cells containing such cation exchanger membranes are thus limited to the boiling temperature of the water. Humidification of the fuel presents a major technical challenge to the use of polymer electrolyte membrane fuel cells (PEM-FC), in which conventional, sulphonated membranes such as Nafion are used.

Thus, for example, perfluorosulphonic acid polymers are used for polymer electrolyte membranes. The perfluorosulphonic acid polymer (such as Nafion) generally has a perfluoro-hydrocarbon matrix, such as a copolymer of tetrafluoroethylene and trifluorovinyl, and a side chain bonded onto this with a sulphonic acid group, such as a side chain with a sulphonic acid group bonded onto a perfluoro-alkylene group.

Cation exchanger membranes preferably involve organic polymers with covalently bonded acid groups, in particular sulphonic acid. Polymer sulphonation methods are described in F. Kucera et. al. Polymer Engineering and Science 1988, Vol. 38, No 5, 783-792.

In the following the most important types of cation exchanger membranes are listed which have enjoyed commercial success when used in fuel cells.

The most important exponent is the perfluorosulphonic acid polymer Nafion® (U.S. Pat. No. 3,692,569). As described in U.S. Pat. No. 4,453,991 this polymer can be placed in solution and then used as a Ionomer. Cation exchanger membranes are also obtained by filling a porous base material with such a Ionomer. Here, for the base material expanded Teflon is preferred (U.S. Pat. No. 5,635,041).

A further perfluorinated cation exchanger membrane can be produced as defined in U.S. Pat. No. 5,422,411 by copolymerisation of trifluorostyrene and sulphonyl modified trifluorostyrene. Composite membranes comprising a porous base material, in particular expanded Teflon, filled with Ionomers comprising such sulphonyl-modified trifluorostyrene copolymers are described in U.S. Pat. No. 5,834,523.

U.S. Pat. No. 6,110,616 describes copolymers of butadiene and styrene and their subsequent sulphonation for the production of cation exchanger membranes.

A further class of part-fluorinated cation exchanger membranes can be produced by laser grafting and subsequent sulphonation. Here, as described in EP667983 or DE19844645, a grafting reaction is carried out with a previously irradiated polymer film, preferably with styrene. In a subsequent sulphonation reaction the sulphonation of the side chains then takes place. Simultaneously with the grafting a cross-linking can also be performed thereby modifying the mechanical properties.

Apart from the above membranes a further class of non-fluorinated membranes has been developed by sulphonation of high-temperature stable thermoplastics. Thus membranes in sulphonated polyether ketones (DE4219077, EP96/01177), sulphonated polysulphone (J. Membr. Sci. 83 (1993) p.211) or sulphonated polyphenylsulphide (DE19527435) are known.

Ionomers produced from sulphonated polyether ketones are described in WO 00/15691.

Furthermore, acid-base blend membranes are known which, as described in DE19817374 or WO 01/18894, are produced by mixing sulphonated polymers and basic polymers.

To further improve the membrane properties a cation exchanger membrane known from the state of the art can be mixed with a high-temperature stable polymer. The production and properties of cation exchanger membranes comprising blends of sulphonated PEK and a) polysulphones (DE4422158), b) aromatic polyamides (42445264) or c) polybenzimidazole (DE19851498) are described.

The disadvantage of these cation exchanger membranes is the fact that the membrane must be humidified, the operating temperature is limited to 100° C., and the membranes have a high permeability to methane. The cause of these disadvantages is the conductivity mechanism of the membrane, in which the transport of the protons is linked to the transport of the water molecule. This is referred to as the "vehicle mechanism" (K.-D. Kreuer, Chem. Mater. 1996, 8, 610-641).

In the second category polymer electrolyte membranes have been developed with complexes of basic polymers and strong acids. Thus WO96/13872 and the corresponding U.S. Pat. No. 5,525,436 describe a method for producing a proton-conducting polymer electrolyte membrane, in which a basic polymer, such as polybenzimidazole, is treated with a strong acid such as phosphoric acid, sulphuric acid, and so on.

In *J. Electrochem. Soc.*, Vol. 142, No. 7, 1995, pp. L121-L123 the doping of a polybenzimidazole in phosphoric acid is described.

With the basic polymer membranes known from the state of the art, the mineral acid used—to achieve the necessary proton conductivity—(usually concentrated phosphoric acid) is either used after forming or alternatively the basic polymer membrane is produced directly from polyphosphoric acid as in German patent application Nos. 10117686.4, 10144815.5 and 10117687.2. The polymer serves here as a vehicle for the electrolyte comprising the highly concentrated phosphoric acid or polyphosphoric acid. Here, the polymer membrane performs other essential functions. In particular, it must have high mechanical stability and act as a separator for the two fuels mentioned in the introduction.

An important advantage of such a phosphoric acid or polyphosphoric acid doped membrane is the fact that a fuel cell, in which such a polymer electrolyte membrane is used, can be operated at temperatures in excess of 100° C. without the humidification of the fuels that would otherwise be necessary. This is based on the property of the phosphoric acid being able to transport the protons without additional water by means of the so-called Grotthus mechanism (K.-D. Kreuer, Chem. Mater. 1996, 8, 610-641).

The possibility of operating at temperatures in excess of 100° C. offers further advantages for the fuel cell system. Firstly, the sensitivity of the Pt catalyst to gas impurities, CO in particular, is significantly reduced. CO is produced as a by-product in the reforming of the hydrogen-rich gas from carbon-containing compounds, such as natural gas, methanol or benzene, or also as an intermediate product in the direct oxidation of methanol. Typically the CO content of the fuel must be less than 100 ppm at temperatures of <100° C. At temperatures in the range 150-200° C., however, even 10,000 ppm CO or more can be tolerated (N. J. Bjerrum et. al. Journal of Applied Electrochemistry, 2001,31, 773-779). This leads to important simplifications in the preceding reforming process and thus to cost reductions for the fuel cell system as a whole.

A major advantage of fuel cells is that fact that during the electrochemical reaction the energy of the fuel is converted directly into electrical energy and heat. In the process, water results as a reaction product on the cathode. A by-product of the electrochemical reaction is therefore heat. For applications in which only power is used to drive electric motors, e.g. in automobile applications, or for the versatile use of battery systems, the heat must be dissipated in order to avoid overheating of the system. Additional energy-consuming devices are then needed for cooling, which further reduce the overall efficiency of the fuel cell. For stationary applications such as the centralised or decentralised generation of power and heat, the heat can be used efficiently by means of available technologies such as heat exchangers. In order to increase efficiency, high temperatures are sought here. If the operating temperature is in excess of 100° C. and if the difference in temperature between the ambient temperature and the operating temperature is great, then it is possible to cool the fuel cell system more efficiently or to use small cooling surfaces and to dispense with additional devices compared with fuel cells which, because of the membrane humidification, have to be operated at below 100° C.

Apart from these advantages such a fuel cell system has a decisive disadvantage. And this is that phosphoric acid or polyphosphoric acid is present as the electrolyte and is not permanently bonded to the basic polymer by ionic interaction and can be washed away by water. As described above, water is formed at the cathode during the electrochemical reaction. If the operating temperature is in excess of 100° C., then the majority of the water is drawn off as vapour via the gas diffusion electrode and the acid loss is very low. If the operating temperature drops below 100° C. however, for example when the cell is started up or shut down or operated at part load if a high power yield is sought, then the water formed condenses and can lead to more intense washing away of the electrolyte, highly concentrated phosphoric acid or polyphosphoric acid. In the method of operation of the fuel cell described above this can lead to a constant loss of conductivity and cell performance, which can lower the lifetime of the fuel cell.

Furthermore, the known membranes doped with phosphoric acid cannot be used in so-called direct methanol fuel cells (DMFC). Such cells are, however, of particular interest since a methanol-water mixture is used as the fuel. If a known membrane with a phosphoric acid base is used, then the fuel cell fails after a relatively short time.

The object of the present invention is therefore to provide a novel polymer electrolyte membrane in which the washing away of the electrolyte is prevented. In particular, therefore, it must be possible to expand the operating temperature range to between <0° C. and 200° C. without the system requiring humidification. A fuel cell containing an inventive polymer electrolyte membrane should be suitable for pure hydrogen and for numerous carbon-containing fuels such as natural gas, benzene, methanol and biomass. In this case the membrane should allow the greatest possible activity of the fuels. The methanol oxidation should, in particular, be especially high compared with known membranes.

In addition, an inventive membrane should be economical and simple to produce. A further object of the present invention was to provide polymer electrolyte membranes which have a high conductivity, in particular a high conductivity over a wide temperature range. In this case the conductivity, in particular at high temperatures, should be achieved without additional humidification.

In addition, a polymer electrolyte membrane should be provided which has high mechanical stability, e.g. a high modulus of elasticity, a high ultimate tensile strength, low creep and high fracture toughness.

Furthermore, another object of the present invention was to offer a membrane that also has a low permeability during operation to the various fuels, such as hydrogen or methanol, and the membrane should also have low oxygen permeability.

These objects are achieved by the production of a liquid that contains a vinyl-containing phosphonic acid and a method for producing a polymer electrolyte membrane through expansion of a polymer film in this liquid and the subsequent polymerisation into a polyvinyl phosphonic acid. Because of the high concentration of vinyl phosphonic acid polymer, its high chain flexibility and the high acid strength of the polyvinylphosphonic acid, the conductivity is based on the Grotthus mechanism and the system therefore requires no additional humidification. The polyvinylphosphonic acid, which can also be cross-linked through reactive groups, forms an inter-penetrating network with the high-temperature stable polymers. Therefore the washing away of the electrolyte by the product water formed or in the case of a DMFC by the aqueous fuel is significantly reduced. An inventive polymer electrolyte membrane has a very low methanol permeability and is particularly suited to use in a DMFC. Thus long-lasting operation of a fuel cell with a number of fuels such as hydrogen, natural gas, benzene, methanol or biomass is possible. In this case the membranes allow a particularly high activity of these fuels. Because of the high temperatures, the methanol oxidation can in this case take place with high activity. In a particular embodiment these membranes are suited to the operation of a so-called moisture-forming DMFC, in particular at temperatures in the range 100 to 200° C.

Thanks to the possibility of operating at temperatures in excess of 100° C., the sensitivity of the Pt catalyst to gas impurities, CO in particular, drops significantly. CO is produced as a by-product in the reforming of the hydrogen-rich gas from carbon-containing compounds, such as natural gas, methanol or benzene, or as an intermediate product in the direct oxidation of methanol. Typically the CO content of the fuel at temperatures in excess of 120° C. can be more than 5,000 ppm, without the catalytic effect of the Pt catalyst being dramatically reduced. At temperatures in the range 150-200°, however, even 10,000 ppm CO or more can be tolerated (N. J. Bjerrum et. al. Journal of Applied Electrochemistry, 2001, 31, 773-779). This leads to important simplifications in the preceding reforming process and thus to cost reductions for the fuel cell system as a whole.

An inventive membrane has a high conductivity over a wide temperature range, and this can also be achieved without additional humidification. Furthermore, a fuel cell which is fitted with an inventive membrane, can also be operated at low temperatures of, for example, 80° C. without the lifetime of the fuel cell being severely reduced.

In addition, membranes of the present invention have a high mechanical stability, in particular a high modulus of elasticity, a high ultimate tensile strength, low creep and high fracture toughness. Furthermore these membranes demonstrate a surprisingly long lifetime.

The object of the present invention is therefore a stable proton-conducting electrolyte membrane obtainable by a method comprising the following steps:

A) expanding a polymer film with a liquid that contains a vinyl-containing phosphonic acid, and
B) polymerisation of the vinyl-containing phosphonic acid present in the liquid introduced in step A).

The polymer film used in step A) is a film that has an expansion of at least 3% in the vinyl phosphonic acid containing liquid. Expansion means an increase in the weight of the film of at least 3%. The expansion is preferably at least 5%, and particularly preferred at least 10%.

The expansion Q is determined gravimetrically from the mass of the film prior to expansion $m_0$ and the mass of the film after polymerisation according to step B), $m_2$.

$$Q=(m_2-m_0)/m_0 \times 100$$

The expansion preferably takes place at a temperature in excess of 0° C., in particular at between ambient temperature (20° C.) and 180° C. in a vinyl phosphonic acid containing liquid that contains at least 5% by weight vinyl phosphonic acid. The expansion can also be performed at high pressure. In this case the limits are determined by commercial considerations and technical possibilities.

The polymer film used for expansion generally has a thickness in the range 5 to 3,000 µm, preferably 10 to 1,500 µm and particularly preferred [sic-translator]. The production of such films from polymers is generally known, and these are to some extent available commercially. The term polymer film means that the film to be expanded comprises polymers, and these films can contain other common additives.

The preferred polymers include, inter alia polyolefins, such as poly(chloroprene), polyacetylene, polyphenylene, poly(p-xylylene), polyarylmethylene, polystyrene, polymethylstyrene, polyvinylalcohol, polyvinylacetate, polyvinylether, polyvinylamine, poly(N-vinylacetamide), polyvinylimidazole, polyvinylcarbazole, polyvinylpyrrolidone, polyvinylpyridine, polyvinylchloride, polyvinylidenechloride, polytetrafluorethylene, polyhexafluorpropylene, copolymers of PTFE and hexafluoropropylene, with perfluoropropylvinylether, with trifluoronitrosomethane, with carbalkoxy-perfluoralkoxyvinylether, polychlorotrifluorethylene, polyvinylfluoride, polyvinylidenefluoride, polyacrolein, polyacrylamide, polyacryinitrile, polycyanacrylate, polymethacrylimide, cycloolefinic copolymers, in particular of norbornen; polymers mit C—O-bonds in the main chain, such as polyacetal, polyoxymethylene, polyether, polypropyleneoxide, polyepichlorohydrine, polytetrahydrofurane, polyphenyleneoxide, polyetherketone, polyester, in particular polyhydroxyacetic acid, polyethyleneterephthalate,—polybutyleneterephthalate, polyhydroxybenzoate, polyhydroxypropionic acid, polypivalolactone, polycaprolactone, polymalonic acid, polycarbonate;

polymer C—S-bonds in the main chain, such as polysulphide ether, polyphenylene sulphide, polyethersulphone;

polymer C—N-bonds in the main chain, such as polyimine, polyisocyanide, polyetherimine, polyetherimide, polyaniline, polyaramide, polyamide, polyhydrazide, polyurethane, polyimide, polyazole, polyazoletherketone, polyazine;

liquid crystalline polymers, in particular Vectra and inorganic polymers such as polysilane, polycarbosilane, polysiloxane, polysilicic acid, polysilicate, silicone, polyphosphazene and polythiazyl.

According to a particular aspect of the present invention high-temperature stable polymers are used which contain at least one nitrogen, oxygen and/or sulphur atom in one or a number of recurring units.

A polymer with high-temperature stability—for the purposes of the present invention—is a polymer where it can be used long-lastingly as a polymer electrolyte in a fuel cell at temperatures in excess of 120° C. Long-lasting means that an inventive membrane can be used for at least 100 hours, preferably at least 500 hours at a minimum of 120° C., preferably 160° C., without the performance, which can be measured according to the method described in WO 01/18894 A2, dropping by more than 50% in relation to the starting performance.

The polymers used in step A) are preferably polymers that have a glass transition temperature or Vicat softening temperature VST/A/50 of at least 100° C., preferably of at least 150° C. with a quite particular preference for at least 180° C.

Particular preference is for polymers that contain at least one nitrogen atom in a recurring unit. Special preference is for polymers that contain at least one aromatic ring with at least one nitrogen heteroatom per recurring unit. Within this group, polyazole-based polymers are particularly preferred. These basic polyazole polymers contain at least one aromatic ring with at least one nitrogen heteroatom per recurring unit.

The aromatic ring is preferably a five- or six-link ring with one to three nitrogen atoms, which can be annellated with another ring, in particular another aromatic ring.

Polyazole-based polymers contain recurring azole units of general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVI) and/or (XVII) and/or (XVIII) and/or (XIX) and/or (XX) and/or (XXI) and/or (XXII)

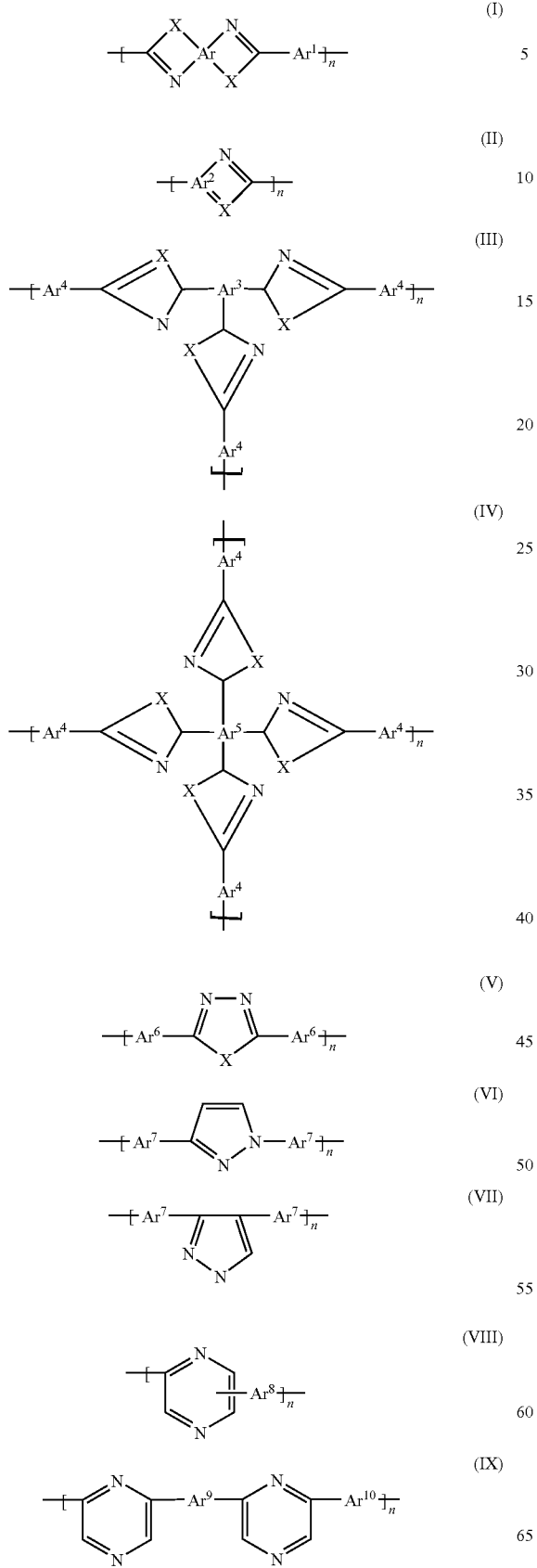
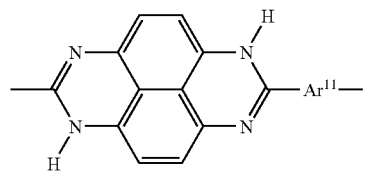
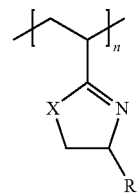
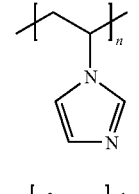
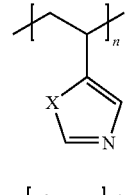
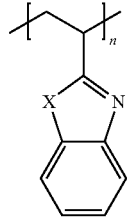
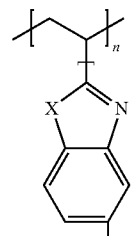
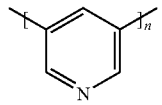
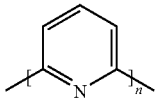
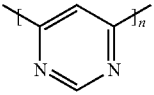

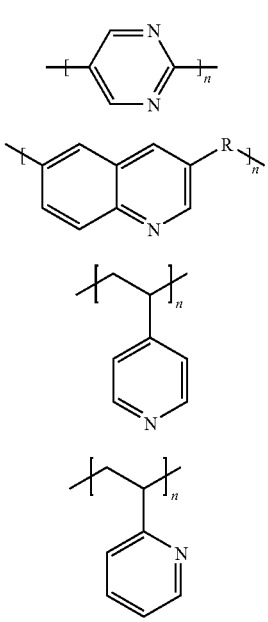

in which
Ar are the same or different and denote a tetravalent aromatic or heteroaromatic group, which can be mono- or multi-cyclic;
$Ar^1$ are the same or different and denote a bivalent aromatic or heteroaromatic group, which can be mono- or multi-cyclic;
$Ar^2$ are the same or different and denote a bivalent or trivalent aromatic or heteroaromatic group, which can be mono- or multi-cyclic;
$Ar^3$ are the same or different and denote a trivalent aromatic or heteroaromatic group, which can be mono- or multi-cyclic;
$Ar^4$ are the same or different and denote a trivalent aromatic or heteroaromatic group, which can be mono- or multi-cyclic;
$Ar^5$ are the same or different and denote a tetravalent aromatic or heteroaromatic group, which can be mono- or multi-cyclic;
$Ar^6$ are the same or different and denote a bivalent aromatic or heteroaromatic group, which can be mono- or multi-cyclic;
$Ar^7$ are the same or different and denote a bivalent aromatic or heteroaromatic group, which can be mono- or multi-cyclic;
$Ar^8$ are the same or different and denote a trivalent aromatic or heteroaromatic group, which can be mono- or multi-cyclic;
$Ar^9$ are the same or different and denote a bivalent or trivalent or tetravalent aromatic or heteroaromatic group, which can be mono- or multi-cyclic;
$Ar^{10}$ are the same or different and denote a bivalent or trivalent aromatic or heteroaromatic group, which can be mono- or multi-cyclic;
$Ar^{11}$ are the same or different and denote a bivalent aromatic or heteroaromatic group, which can be mono- or multi-cyclic;
X is the same or different and denotes oxygen, sulphur or an amino group, that carries one hydrogen atom, a group containing between: 1 and 20 carbon atoms, preferably a branched or unbranched alkyl or alkoxy group, or an aryl group as an additional radical;
R is the same or different and denotes hydrogen, an alkyl group and an aromatic group and n, m is a whole number greater than or equal to 10, preferably greater than or equal to 100.

Inventively preferred aromatic or heteroaromatic groups can be derived from benzene, naphthalene, biphenyl, diphenylether, diphenylmethane, diphenyldimethylmethane, bisphenol, diphenylsulphone, thiophene, furane, pyrrol, thiazole, oxazole, imidazole, isothiazole, isoxazole, pyrazole, 1,3,4-oxadiazole, 2,5-diphenyl-1,3,4-oxadiazole, 1,3,4-thiadiazole, 1,3,4-triazole, 2,5-diphenyl-1,3,4-triazole, 1,2,5-triphenyl-1,3,4-triazole, 1,2,4-oxadiazole, 1,2,4-thiadiazole, 1,2,4-triazole, 1,2,3-triazole, 1,2,3,4-tetrazole, benzo[b]thiophene, benzo[b]furane, indole, benzo[c]thiophene, benzo[c]furane, isoindole, benzoxazole, benzothiazole, benzimidazole, benzisoxazole, benzisothiazole, benzopyrazole, benzothiadiazole, benzotriazole, dibenzofurane, dibenzothiophene, carbazole, pyridine, bipyridine, pyrazine, pyrazole, pyrimidine, pyridazine, 1,3,5-triazine, 1,2,4-triazine, 1,2,4,5-triazine, tetrazine, chinoline, isochinoline, chinoxaline, chinazoline, cinnoline, 1,8-naphthyridine, 1,5-naphthyridine, 1,6-naphthyridine, 1,7-naphthyridine, phthalazine, pyridopyrimidine, purine, pteridine or chinolizine, 4H-chinolizine, diphenylether, anthracene, benzopyrrol, benzooxathiadiazole, benzooxadiazole, benzopyridine, benzopyrazine, benzopyrazidine, benzopyrimidine, benzotriazine, indolizine, pyridopyridine, imidazopyrimidine, pyrazinopyrimidine, carbazole, aciridine, phenazine, benzochinoline, phenoxazine, phenothiazine, acridizine, benzopteridine, phenanthroline and phenanthrene, which if necessary can also be substituted.

In this case the substitution pattern of $Ar^1$, $Ar^4$, $Ar^6$, $Ar^7$, $Ar^8$, $Ar^9$, $Ar^{10}$, $Ar^{11}$ is arbitrary, in the case of phenylene for example $Ar^1$, $Ar^4$, $Ar^6$, $Ar^7$, $Ar^8$, $Ar^9$, $Ar^{10}$, $Ar^{11}$ can be ortho-, meta- and para-phenylene. Particularly preferred groups can be derived from benzene and biphenylene, which if necessary can also be substituted.

Preferred alkyl groups are short-chained alkyl groups with between 1 and 4 carbon atoms, such as methyl-, ethyl-, n- or i-propyl- and t-butyl-groups.

Preferred aromatic groups are phenyl- or naphthyl-groups. The alkyl groups and the aromatic groups can be substituted.

Preferred substitutes are halogen atoms such as fluorine, amino groups, hydroxy groups or short-chain alkyl groups such as methyl- or ethyl-groups.

Preference is for polyazoles with recurring units of formula (I) in which the X radicals within a recurring unit are the same.

The polyazoles can basically also have differing recurring units, which for example differ by their X radicals. Preferably, however, there are only identical X radicals in a recurring unit.

In a further embodiment of the present invention the polymer containing recurring azole units is a copolymer or a blend that contains at least two units of formula (I) to (XXII), which differ from each other. The polymers can be present as block copolymers (diblock, triblock), statistical copolymers, periodic copolymers and/or alternating polymers.

The number of recurring azole units in the polymers is preferably a whole number greater than or equal to 10. Particularly preferred polymers contain at least 100 recurring azole units.

Within the context of the present invention polymers containing recurring benzimidazole units are preferred. Some examples of extremely advantageous polymers containing recurring benzimidazole units are provided by the following formulas:

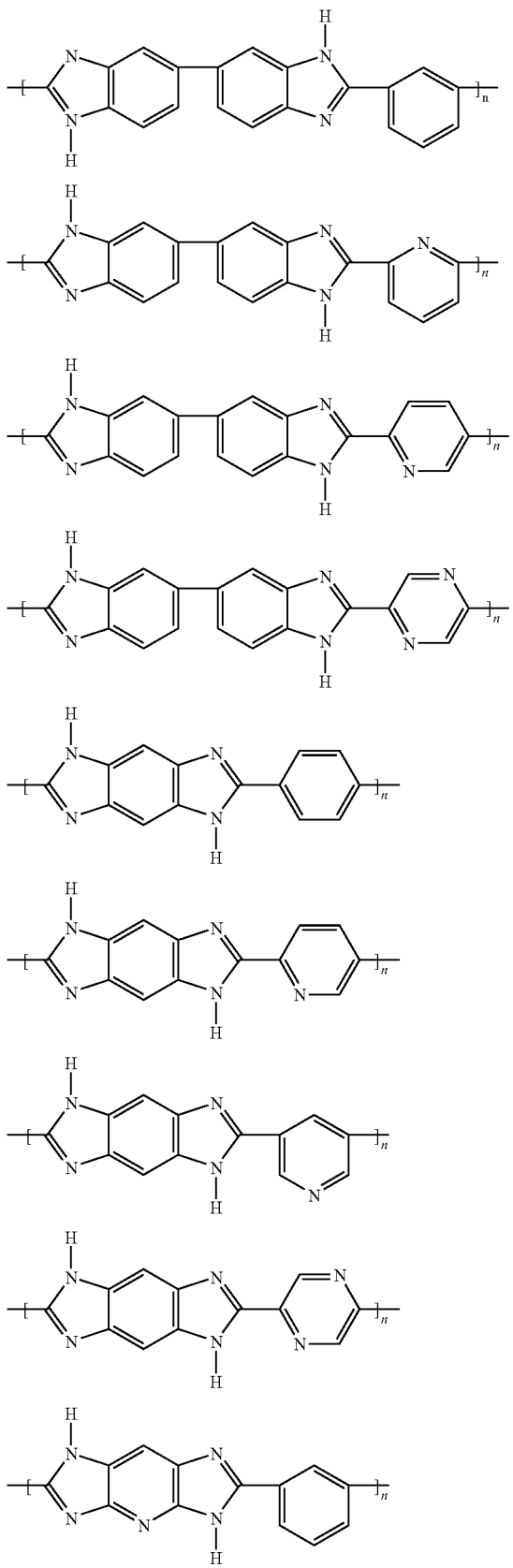
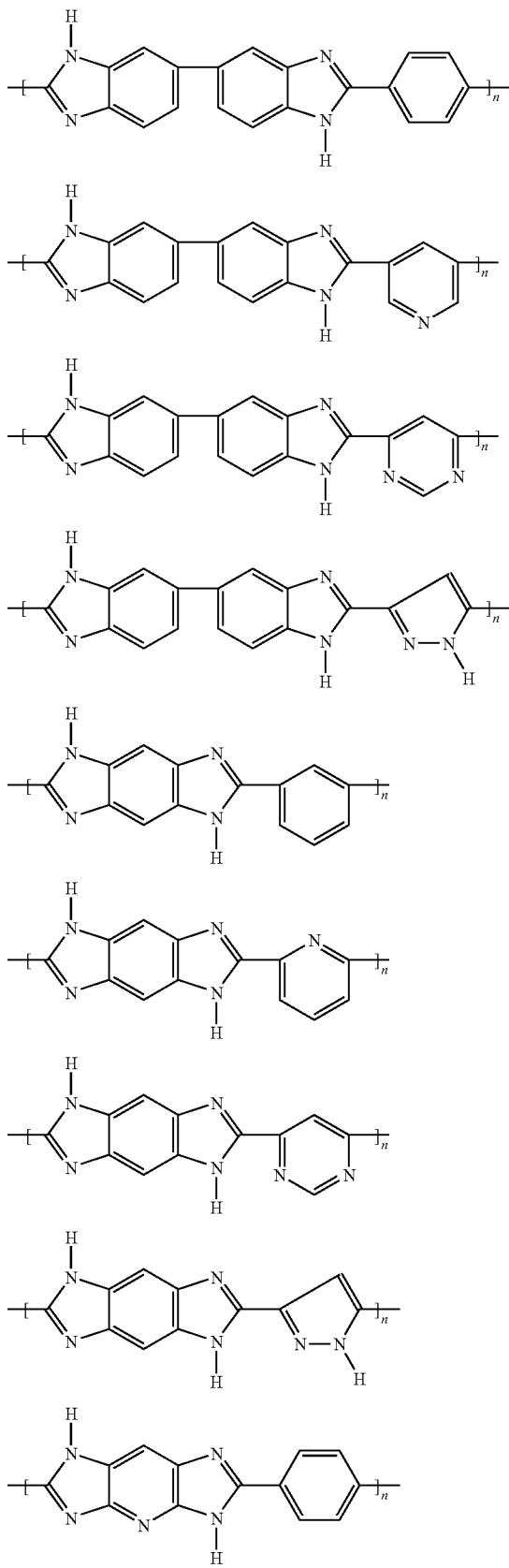

-continued

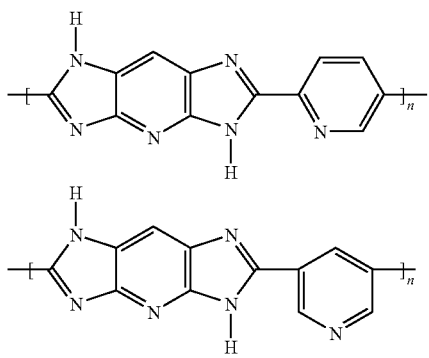

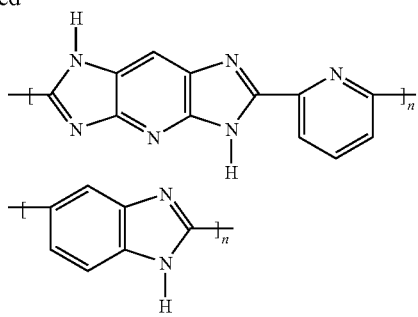

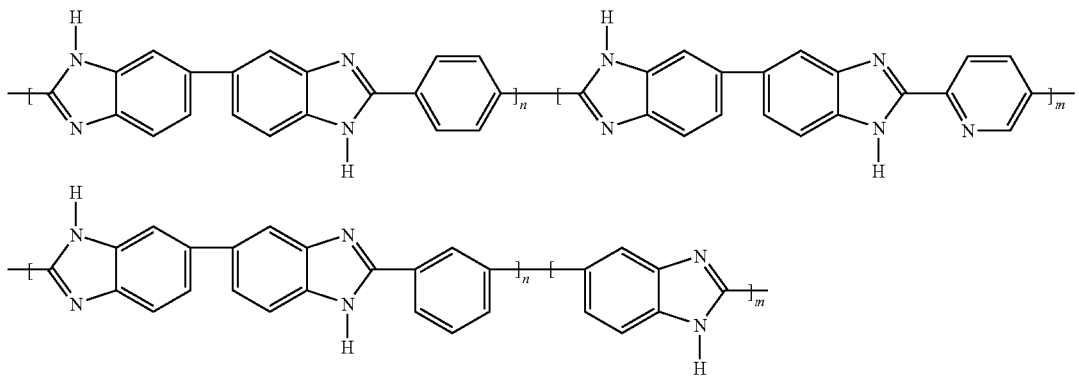

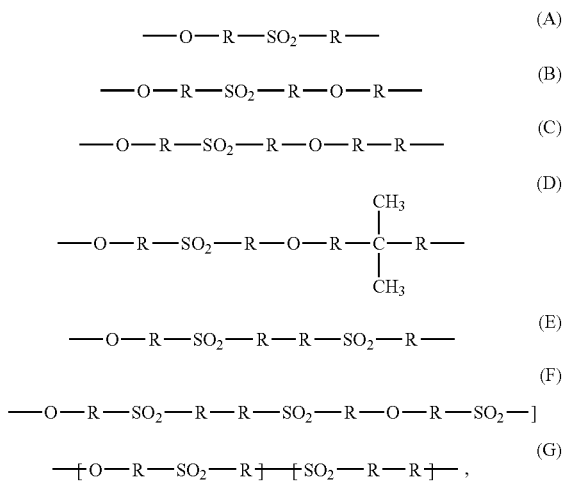

in which n and m is a whole number greater than or equal to 10, preferably greater than or equal to 100.

The polyazoles used in step A), in particular the polybenzimidazole, however, are characterised by a high molecular weight. Measured as the intrinsic viscosity this is preferably at least 0.2 dl/g, in particular 0.8 to 10 dl/g, with particular preference for between 1 and 5 dl/g.

Further preferred polyazole polymers are polyimidazole, polybenzthiazole, polybenzoxazole, polytriazole, polyoxadiazole, polythiadiazole, polypyrazole, polyquinoxalines, poly(pyridine), poly(pyrimidine), and poly(tetrazapyrene).

Particular preference is for Celazole made by Celanese, in particular one in which the polymer processed by sieving as described in German patent application No. 10129458.1 is used.

Furthermore, polyazoles are preferred which have been obtained by the methods described in German patent application No. 10117687.2.

The preferred polymers include polysulphone, in particular polysulphone with aromatic and/or heteroaromatic groups in the main chain. According to a particular aspect of the present invention preferred polysulphones and polyethersulphones have a melt volume-flow rate MVR 300/21.6 of less than or equal to 40 cm³/10 min, in particular less than or equal to 30 cm³/10 min with particular preference for less than or equal to 20 cm³/10 min measured according to ISO 1133 In this case polysulphones with a Vicat Softening Temperature VST/A/50 of 180° C. to 230° C. are preferred. In a further preferred embodiment of the present invention the mean molecular weight of the polysulphone is greater than 30,000 g/mol.

The polysulphone-based polymers include in particular polymers having recurring units with concatenating sulphone groups of general formula A, B, C, D, E, F and/or G:

$$—O—R—SO_2—R— \quad (A)$$

$$—O—R—SO_2—R—O—R— \quad (B)$$

$$—O—R—SO_2—R—O—R—R— \quad (C)$$

$$—O—R—SO_2—R—O—R—\underset{\underset{CH_3}{|}}{\overset{\overset{CH_3}{|}}{C}}—R— \quad (D)$$

$$—O—R—SO_2—R—R—SO_2—R— \quad (E)$$

$$—O—R—SO_2—R—R—SO_2—R—O—R—SO_2—] \quad (F)$$

$$—[O—R—SO_2—R]—[SO_2—R—R]—, \quad (G)$$

in which the radicals R independently of each other in the same way or differently represent an aromatic or heteroaromatic group, these radicals having been explained in detail previously. These include in particular 1,2-phenylene, 1,3-phenylene, 1,4-phenylene, 4,4'-biphenyl, pyridine, chinolin, naphthalin and phenanthren.

The polysulphones preferred within the context of the present invention include homo- and copolymers, for example statistical copolymers. Particularly preferred polysulphones contain recurring units of formulas H to N:

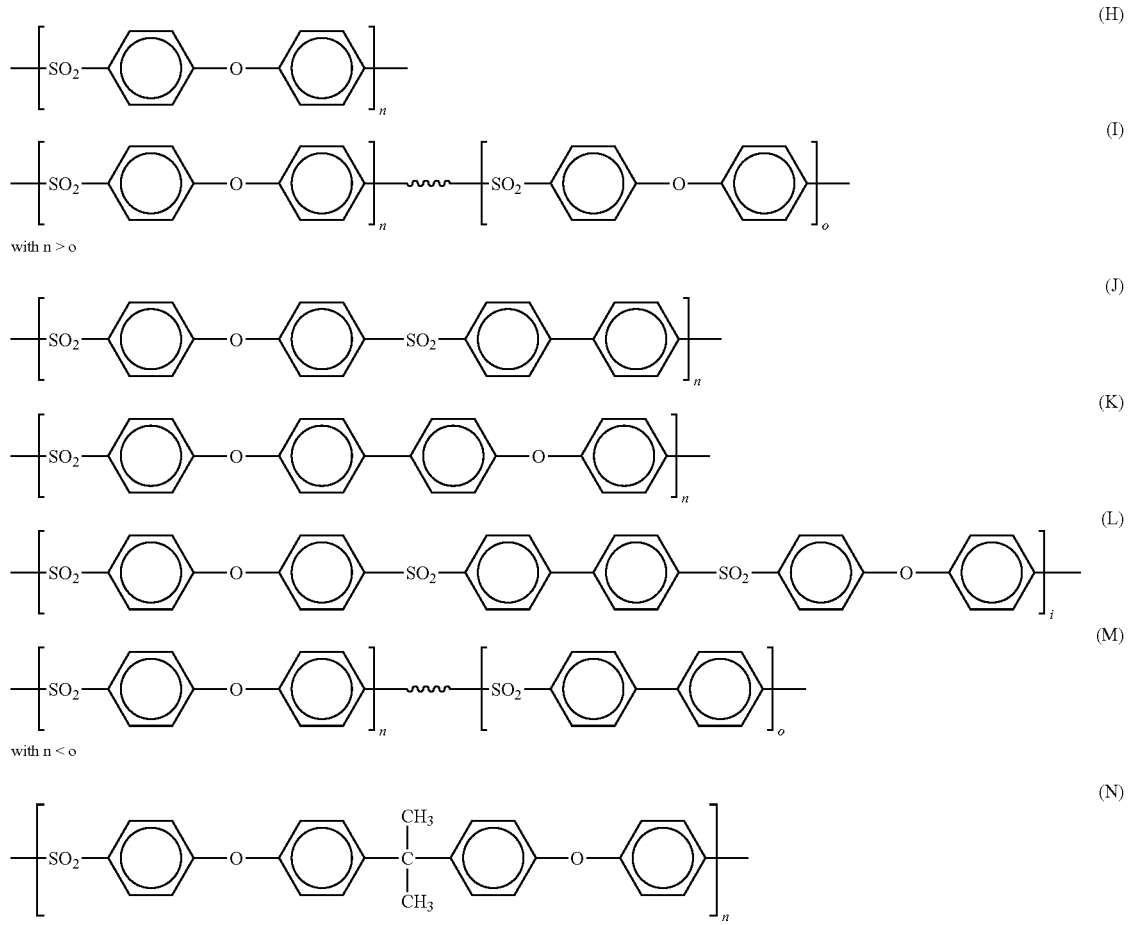

The polysulphones described above can be obtained commercially under the trade names ®Victrex 200 P, ®Victrex 720 P, ®Ultrason E, ®Ultrason S, ®Mindel, ®Radel A, ®Radel R, ®Victrex HTA, ®Astrel and ®Udel.

In addition, polyetherketone, polyetherketonketone, polyetheretherketone, polyetheretherketonketone and polyarylketone are particularly preferred. These high performance polymers are in themselves known and can be obtained commercially under the trade name Victrex® PEEK™, ®Hostatec and ®Kadel.

The above mentioned polymers can be used individually or as a mixture (blend). In this case the particular preference is for blends containing polyazole and/or polysulphone. Using blends allows the mechanical characteristics to be improved and the material costs to be reduced.

The polymer film can also be further modified, for example by cross-linking as described in German patent application No. 10110752.8 or in WO 00/44816. In a preferred embodiment the polymer film in a basic polymer and at least one blending component that is used for expansion also contains a cross-linking agent as described in patent application No. 10140147.7.

It is also an advantage if the polymer film used for expansion is first treated as described in German patent application No. 10109829.4. This variant is advantageous in increasing the expansion of the polymer film.

Instead of the polymer films produced using conventional methods polyazole-containing polymer membranes as described in patent applications Nos. 10117686.4, 10144815.5, 10117687.2 can also be used. Here these have the polyphosphoric acid and/or the phosphoric acid removed and are used in step A). The inventive polymer membrane can also have further fillers and/or accessory agents.

To further improve the application engineering properties the membrane can also have further fillers, in particular proton-conducting fillers, and additional acids, added. The addition can, for example, take place in step A). Furthermore, these additives, if they are in liquid form, can also be added after polymerisation in accordance with step B).

Non-restrictive examples of proton-conducting fillers are:

Sulphates such as: $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, Phosphates such as $Zr_3(PO_4)_4$, $Zr(HPO_4)_2$, $HZr_2(PO_4)_3$, $UO_2PO_4.3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, Polyacids such as $H_3PW_{12}O_{40}.nH_2O$ (n=21-29), $H_3SiW_{12}O_{40}.nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$ Selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, Oxides such as $Al_2O_3$, $Sb_2O_5$, $ThO_2$, $SnO_2$, $ZrO_2$, $MoO_3$ Silicates such as zeolites, zeolites ($NH_4+$), layer silicates, tectosilicates, H-hatrolits, H-mordenits, $NH_4$-analcines, $NH_4$-sodalites, $NH_4$-gallates, H-montmorillonites Acids such as $HClO_4$, $SbF_5$ Fillers such as carbides, in particular SiC, $Si_3N_4$, fibres, in particular glass fibres, glass powders and/or polymer fibres, preferably polyazole-based.

These additives can be contained in the proton-conducting polymer membrane in the normal quantities, but with the positive properties, such as high conductivity, long lifetime and high mechanical stability of the membrane not being too adversely affected by the addition of excessive quantities of additives. In general the membrane contains, after polymerisation in accordance with step B), a maximum of 80% by weight, preferably a maximum of 50% by weight, with particular preference for a maximum of 20% by weight, of additives.

This membrane can also contain perfluorinated sulphonic acid additives (chiefly 0.1-20% by weight, preferably 0.2-15% by weight and most preferably 0.2-10% by weight). These additives result in performance improvements in the vicinity of the cathodes to increase the oxygen solubility and oxygen diffusion and to reduce the adsorption of phosphoric acid and phosphate on platinum. (Electrolyte additives for phosphoric acid fuel cells. Gang, Xiao; Hjuler, H. A.; Olsen, C.; Berg, R. W.; Bjerrum, N. J. Chem. Dep. A, Tech. Univ. Denmark, Lyngby, Den. J. Electrochem. Soc. (1993), 140(4), 896-902 and Perfluorosulphonimide as an additive in phosphoric acid fuel cell. Razaq, M.; Razaq, A.; Yeager, E.; Des-Marteau, Darryl D.; Singh, S. Case Cent. Electrochem. Sci., Case West. Reserve Univ., Cleveland, Ohio, USA. J. Electrochem. Soc. (1989), 136(2), 385-90.)

Non-restrictive examples of persulphonated additives are:

trifluromethanesulphonic acid, potassium trifluoromethanesulphonate, sodium trifluoromethanesulphonate, lithium trifluoromethanesulphonate, ammonium trifluoromethanesulphonate, potassium perfluorohexanesulphonate, sodium perfluorohexanesulphonate, lithium perfluorohexanesulphonate, ammonium perfluorohexanesulphonate, perfluorohexanesulphonate acid, potassium nonafluorobutanesulphonate, sodium nonafluorobutanesulphonate, lithium nonafluorobutanesulphonate, ammonium nonafluorobutanesulphonate, caesium nonafluorobutanesulphonate, triethylammoniumperfluorohexasulphonate and perfluorosulphonimide.

Vinyl-containing phosphoric acids are known in technical circles. These are compounds that have at least one carbon-carbon double bond and at least one phosphonic acid group. Preferably the two carbon atoms which form the carbon-carbon double bond have at least two, preferably three bonds with groups that lead to a low steric hindrance to the double bond. These groups include, inter alia, hydrogen atoms and halogen atoms, in particular fluorine atoms. Within the context of the present invention the polyvinylphosphonic acid results from the polymerisation product which is obtained by polymerisation of the vinyl-containing phosphonic acid alone or with further monomers and/or cross-linking agents.

The vinyl-containing phosphonic acid can contain one, two, three or more carbon-carbon double bonds. Furthermore, the vinyl-containing phosphonic acid can contain one, two, three or more phosphonic acid groups.

In general the vinyl-containing phosphonic acid contains between 2 and 20, preferably between 2 and 10, carbon atoms.

The vinyl-containing phosphonic acid used in step A) preferably involves compounds of the formula

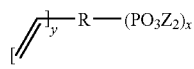

in which

R denotes a bond, a C1-C15-alkyl group, C1-C15-alkoxy group, ethyleneoxy group or C5-C20-aryl or heteroaryl group, and the abovementioned radicals for their parts can be substituted by halogen, —OH, COOZ, —CN, $NZ_2$ Z independently of each other denotes hydrogen, a C1-C15-alkyl group, C1-C15-alkoxy group, ethyleneoxy group or C5-C20-aryl or heteroaryl group, and the abovementioned radicals for their parts can be substituted by halogen, —OH, COOZ, —CN, $NZ_2$ and x denotes a whole number 1, 2, 3, 4, 5, 6, 7, 8, 9 or 10 y denotes a whole number 1, 2, 3, 4, 5, 6, 7, 8, 9 or 10 and/or the formula

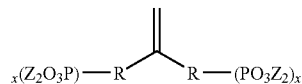

in which

R denotes a bond, a C1-C15-alkyl group, C1-C15-alkoxy group, ethyleneoxy group or C5-C20-aryl or heteroaryl group, and the abovementioned radicals for their parts can be substituted by halogen, —OH, COOZ, —CN, $NZ_2$ Z independently of each other denotes hydrogen, a C1-C15-alkyl group, C1-C15-alkoxy group, ethyleneoxy group or C5-C20-aryl or heteroaryl group, and the abovementioned radicals for their parts can be substituted by halogen, —OH, COOZ, —CN, $NZ_2$ and x denotes a whole number 1, 2, 3, 4, 5, 6, 7, 8, 9 or 10 and/or the formula

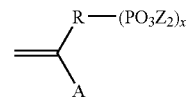

in which

A represents a group of formula $COOR^2$, CN, $CONR^2_2$, $OR^2$ and/or $R^2$, in which $R^2$ denotes hydrogen, a C1-C15-alkyl group, C1-C15-alkoxy group, ethyleneoxy group or C5-C20-aryl or heteroaryl group, and the abovementioned radicals for their parts can be substituted by halogen, —OH, COOZ, —CN, $NZ_2$, R denotes a bond, a bivalent C1-C15-alkylene group, bivalent C1-C15-alkyleneoxy group, for example an ethyleneoxy group or bivalent C5-C20-aryl or heteroaryl group, and the abovementioned radicals for their parts can be substituted by halogen, —OH, COOZ, —CN, $NZ_2$, Z independently of each other denotes hydrogen, a C1-C15-alkyl group, C1-C15-alkoxy group, ethyleneoxy group or C5-C20-aryl or heteroaryl group, and the abovementioned radicals for their parts can be substituted by halogen, —OH, COOZ, —CN, NZ₂ and x denotes a whole number 1, 2, 3, 4, 5, 6, 7, 8, 9 or 10.

The preferred vinyl-containing phosphonic acids include, inter alia, alkenes, which contain phosphonic acid groups, such as ethene phosphonic acid, propene phosphonic acid, butene phosphonic acid; acrylic acid and/or methacrylic acid compounds, which contain phosphonic acid groups, such as 2-phosphonomethyl-acrylic acid, 2-phosphonomethyl-methacrylic acid, 2-phosphonomethyl-acrylic amide and 2-phosphonomethyl-methacrylic acid amide.

Particular preference is for the use of commercially available vinyl phosphonic acid (ethene phosphonic acid), such as that obtainable from Aldrich or Clariant G mbH. A preferred vinyl phosphonic acid has a purity of more than 70%, in particular 90% and with particular preference for a purity of more than 97%.

The vinyl-containing phosphonic acids can also be used in the form of derivates which can then be converted into the acid, with this conversion to acid also being possible in the polymerised state. These derivatives include in particular the salts, esters, amides and halogenides of the vinyl-containing phosphonic acids.

The expanded polymer film produced in step A) includes after expansion preferably at least 10% by weight, in particular at least 50% by weight and with particular preference for at least 70% by weight, in relation to the total weight, vinyl-containing phosphonic acid. According to a particular aspect of the present invention, the expanded polymer film produced in step A) includes a maximum of 60% by weight polymer film, in particular a maximum of 50% by weight polymer film and with particular preference for a maximum of 30% by weight polymer film, in relation to the total weight. These variables can also be determined by the increase in weight brought about by the expansion.

The liquid used in step A) for expansion can also contain further organic and/or inorganic solvents. The organic solvents include, in particular, polar aprotic solvents, such as dimethylsulphoxide (DMSO), esters, such as ethyl acetate, and polar protic solvents, such as alcohols, ethanol, propanol, isopropanol and/or butanol. The organic solvents include, in particular, water, phosphoric acid and polyphosphoric acid.

These can have a positive influence on processability. In particular, the addition of the organic solvent can improve the expansion of the membrane. The content of vinyl-containing phosphonic acid in such solutions is at least 5% by weight, preferably at least 10% by weight, and with particular preference for between 10 and 97% by weight.

In a further embodiment of the invention the liquid containing vinyl-containing phosphonic acid also includes monomers that are capable of cross-linking. These are in particular compounds that have at least 2 carbon-carbon double bonds. Preference is for diene, triene, tetraene, dimethylacrylate, trimethylacrylate, tetramethylacrylate, diacrylate, triacrylate and tetraacrylate.

Particular preference is for diene, triene, tetraene of the formula

dimethylacrylate, trimethylcrylate, tetramethylacrylate of the formula

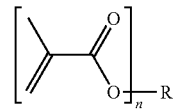

and diacrylate, triacrylate, tetraacrylate of the formula

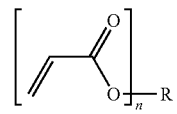

in which

R denotes a C1-C15-alkyl group, C5-C20-aryl or heteroaryl group, NR', —SO₂, PR', or Si(R')₂, and the abovementioned radicals can be substituted, R' denotes independently of each other hydrogen, a C1-C15-alkyl group, C1-C15-alkoxy group, C5-C20-aryl or heteroaryl group and n is at least 2.

The substitutes for the abovementioned radical R preferably involve halogen, hydroxyl, carboxy, carboxyl, carboxylester, nitrile, amine, ailyl and siloxane radicals.

Particularly preferred cross-linkers are allylmethacrylate, ethyleneglycoldimethacrylate, diethyleneglycoldimethacrylate, triethyleneglycoldimethacrylate, tetra- and polyethyleneglycoldimethacrylate, 1,3-butanedioldimethacrylate, glycerinedimethacrylate, diurethanedimethacrylate, trimethylpropanetrimethacrylate, epoxyacrylate, such as Ebacryl, N',N-methylenebisacrylamide, carbinol, butadiene, isoprene, chloroprene, divinylbenzene and/or bisphenol-A dimethylacrylate. These compounds are commercially available, for example, from the Sartomer Company Exton, Pa. under the designations CN-120, CN104 and CN-980.

The use of cross-linking agents is optional, and these compounds can usually be used in the range 0.05 to 30% by weight, preferably 0.1 to 20% by weight, and with particular preference for between 1 and 10% by weight, with reference to the vinyl-containing phosphonic acid.

The liquid containing the vinyl-containing phosphonic acid can be a solution and the liquid can also contain suspended and/or dispersed constituents. The viscosity of the liquid containing vinyl-containing phosphonic acid can have a very wide range, and adjustment of the viscosity can be performed by addition of solvents or increasing the temperature. The dynamic viscosity is preferably in the range 0.1 to 10,000 mPa*s, in particular 0.2 to 2000 mPa*s, and these values can, for example, be measured in accordance with DIN 53015.

The expansion of the film in step A) preferably takes place at temperatures in excess of 0° C., with particular preference for between ambient temperature (20° C.) and 160° C. In principle the expansion can also take place at low temperatures, but the time required for expansion increases with a resultant drop in economic efficiency. At excessively high temperatures the film used for expansion can be damaged. The expansion time is dependent upon the temperature selected. The treatment time must be selected so that the desired expansion is achieved.

The polymerisation of the vinyl-containing phosphonic acid in step B) preferably takes place radically. The radical formation can take place thermally, chemically and/or electrochemically.

For example, a starter solution, which contains at least one substance capable of radical formation, can be added to the liquid according to step A). Furthermore, a starter solution can be applied to the expanded planar formation. This can take place using in themselves known methods (such as spraying, immersion, etc.) which are part of the state of the art.

Suitable radical formers include azo compounds, peroxy compounds, persulphate compounds or azoamidine. Non-restrictive examples are dibenzoylperoxide, dicumol peroxide, cumol hydroperoxide, diisopropylperoxydicarbonate, bis(4-t-butylcyclohexyl) peroxydicarbonate, dipotassium persulphate, ammonium peroxydisulphate, 2,2'-azobis(2-methylpropionitril) (AIBN), 2,2'-azobis-(isobutyric acid amine)hydrbchloride, benzpinacol, dibenzyl derivates, methylethylenketoneperoxide, 1,1-azobiscyclohexanecarbonitrile, methylethylketoneperoxide, acetylacetoneperoxide, dilaurylperoxide, didecanoylperoxide, tert.-butylper-2-ethylhexanoate, ketoneperoxide, methylisobutylketoneperoxide, cyclohexanoneperoxide, dibenzoylperoxide, tert.-butylperoxybenzoate, tert.-butyl peroxyisopropylcarbonate, 2,5-bis (2-ethylhexanoyl-peroxy)-2,5-dimethylhexane, tert.-butylperoxy-2-ethylhexanoate, tert.-butyl peroxy-3,5,5-trimethyl hexanoate, tert.-butyl peroxyisobutyrate, tert.-butylperoxyacetate, dicumylperoxide, 1,1-bis(tert.-butylperoxy)cyclohexane, 1,1-bis(tert.-butylperoxy)3,3,5-trimethylcyclohexane, cumylhydroperoxide, tert.-butylhydroperoxide, bis(4-tert.-butylcyclohexyl)peroxydicarbonate, and the radical formers available from DuPont under the ®Vazo name, such as ®Vazo V50 and ®Vazo WS.

Radical formers can also be used that form radicals under irradiation. The preferred compounds include, inter alia, α,α-diethoxyacetophenone (DEAP, Upjon Corp), n-butyl benzoine ether ((®Trigonal-14, AKZO) and 2,2-dimethoxy-2-phenylacetophenone (®Igacure 651) and 1-benzoylcyclohexanol (®Igacure 184), bis(2,4,6-trimethyl-benzoyl)-phenylphosphinoxide (®Irgacure 819) and 1-[4-(2-hydroxyethoxy) phenyl]-2-hydroxy-2-phenylpropan-1-one (®Irgacure 2959), which are each commercially available from Ciba Geigy Corp.

Normally between 0.0001 and 5% by weight, in particular between 0.01 and 3% by weight (with reference to the vinyl-containing phosphonic acid) of radical formers are added. The quantity of radical formers can be varied according to the desired degree of polymerisation.

The polymerisation can also take place under the effect of IR or NIR (IR=infrared, i.e. light with a wavelength of more than 700 nm; NIR=near infrared, i.e. light with a wavelength in the range approx. 700 to 2,000 nm or an energy in the range approx. 0.6 to 1.75 eV).

The polymerisation can also take place under the effect of UV light with a wavelength of less than 400 nm. This polymerisation method is in itself known and is, for example, described in Hans Joerg Elias, Makromolekulare Chemie, 5th Edition, Volume 1, pp. 492-511; D. R. Arnold, N. C. Baird, J. R. Bolton, J. C. D. Brand, P. W. M Jacobs, P. de Mayo, W. R. Ware, Photochemistry—An Introduction, Academic Press, New York and M. K. Mishra, Radical Photopolymerization of Vinyl Monomers, J. Macromol. Sci.-Revs. Macromol. Chem. Phys. C22(1982-1983) 409.

The polymerisation can also be achieved through the effects of β-, γ- and/or electron radiation. According to a particular embodiment of the present invention a membrane is irradiated with a radiation dose in the range 1 to 300 kGy, preferably 3 to 200 kGy and with a quite particular preference for 20 to 100 kGy.

The polymerisation of the vinyl-containing phosphonic acid in step B) preferably takes place at temperatures in excess of ambient temperature (20° C.) and below 200° C., in particular at temperatures of between 40° C. and 150° C., with particular preference for between 50° C. and 120° C. The polymerisation preferably takes place under normal pressure, but can also take place under pressurisation. The polymerisation leads to a hardening of the expanded polymer film according to step A), and this hardening can be monitored using micro-hardness measurement. The increase in hardness caused by the polymerisation is preferably at least 20%, in relation to the hardness of the polymer film expanded in step A).

According to a particular embodiment of the present invention the membranes have a high mechanical stability. This variable is a result of the hardness of the membrane, which is determined using micro-hardness measurement in accordance with DIN 50539. For this the membrane is successively stressed with a Vickers diamond for 20 seconds at up to a force of 3 nM and the penetration depth is determined. Accordingly the hardness at ambient temperature is at least 0.01 N/mm$^2$, preferably at least 0.1 N/mm$^2$ with quite particular preference for at least 1 N/mm$^2$, without this being restrictive. Then the force is kept constant for 5 s at 3 mN and the creep is calculated from the penetration depth. With preferred membranes the creep $C_{HU}$ 0.003/20/5 under these conditions is less than 20%, preferably less than 10% and with a particular preference for less than 5%. The modulus determined by means of micro-hardness measurement is at least 0.5 MPa, in particular at least 5 MPa with quite particular preference for at least 10 MPa, without this being restrictive.

Depending on the desired degree of polymerisation the planar formation, which is obtained by expansion of the polymer film and subsequent polymerisation, is a self-supporting membrane. The degree of polymerisation is preferably at least 2, in particular at least 5, with a particular preference for at least 30 recurring units, in particular at least 50 recurring units with a quite particular preference for at least 100 recurring units. This degree of polymerisation is determined from the mean of the molecular weight $M_n$ which can be determined using GPC methods. Because of the problems of isolating the polyvinylphosphonic acid contained in the membrane without decomposing it, this value is determined by a test which is performed by polymerisation of vinyl phosphonic acid without solvent and without addition of polymers. In this case the proportion by weight of vinyl phosphonic acid and radical starter compared with the ratios following dissolution of the membrane is kept constant. The conversion that is achieved in a comparative polymerisation is preferably greater than or equal to 20%, in particular greater than or equal to 40% with a particular preference for greater than or equal to 75%, with reference to the vinyl-containing phosphonic acid used.

The inventive polymer membrane contains between 0.5 and 97% by weight of polymer and between 99.5 and 3% by weight polyvinylphosphonic acid. The inventive polymer membrane preferably contains between 3 and 95% by weight of the polymer and between 97 and 5% by weight polyvinylphosphonic acid, with particular preference for between 5 and 90% by weight of the polymer and between 95 and 10% by weight polyvinylphosphonic acid. In addition the inventive polymer membrane can also contain further fillers and/or accessory agents.

Following the polymerisation in accordance with step C) the membrane can be cross-linked thermally, photochemically, chemically and/or electrochemically on the surface. This hardening of the membrane surface further improves the properties of the membrane.

According to a particular aspect the membrane can be heated to a temperature of at least 150° C., preferably at least 200° C. with a particular preference for at least 250° C. The thermal cross-linking preferably takes place in the presence of oxygen. The oxygen concentration in this step of the process is normally in the range 5 to 50% by volume, preferably 10 to 40% by volume, without this being restrictive.

The cross-linking can also take place under the effect of IR or NIR (IR=infrared, i.e. light with a wavelength of more than 700 nm; NIR=near infrared, i.e. light with a wavelength in the range approx. 700 to 2,000 nm or an energy in the range approx. 0.6 to 1.75 eV) and/or UV-light. Another method is irradiation with β-, γ- and/or electron radiation. The radiation dose in this case is preferably between 5 and 200 kGy, in particular between 10 and 100 kGy. The irradiation can be performed in air or under an inert gas. This improves the usage properties of the membrane, in particular the durability.

Depending on the desired degree of cross-linking the duration of the cross-linking reaction can fall within a wide range. In general the reaction time is in the range from 1 second to 10 hours, preferably 1 minute to 1 hour, without this being restrictive.

The inventive polymer membrane has improved material properties compared with the previously known doped polymer membranes. In particular, compared with known un-doped polymer membranes they already have an intrinsic conductivity. This is due in particular to the presence of a polymeric polyvinylphosphonic acid. The intrinsic conductivity of the inventive membrane at temperatures of 160° C. is generally at least 0.001 S/cm, preferably at least 10 mS/cm, in particular at least 15 mS/cm and with a particular preference for at least 20 mS/cm. These values are achieved without humidification.

The specific conductivity is measured by means of impedance spectroscopy in a 4-pole arrangement in potentiostatic mode and using platinum electrodes (wire, 0.25 mm diameter). The distance between the current-collection electrodes is 2 cm. The spectrum obtained is evaluated using a simple model comprising a parallel arrangement of an ohmic resistor and a capacitor. The sample cross-section of the phosphoric acid-doped membrane is measured immediately prior to the sample being mounted. In order to measure the temperature-dependency the measurement cell is heated in an oven to the desired temperature and adjusted by, means of a Pt-100 thermocouple in the immediate vicinity of the sample. Once the temperature has been reached the sample is maintained at this temperature for 10 minutes before starting.

According to a particular embodiment the inventive membranes have a particularly low methanol crossover. This variable can be expressed by the crossover current density.

The crossover current density, during operation with 0.5 M methanol solution and at 90° C. in a so-called liquid direct methanol fuel cell, is preferably less than 100 mA/cm$^2$, in particular less than 70 mA/cm$^2$ with a quite particular preference for less than 50 mA/cm$^2$ and an even greater preference for less than 10 mA/cm$^2$. The crossover current density, during operation with 2 M methanol solution and at 160° C. in a so-called gaseous fuel direct methanol fuel cell, is preferably less than 100 mA/cm$^2$, in particular less than 50 mA/cm$^2$ with a quite particular preference for less than 10 mA/cm$^2$.

In order to determine the crossover current density the carbon dioxide mixture that is released at the cathode is measured using a $CO_2$ sensor. The crossover current density is determined from the value of the $CO_2$ quantity thereby obtained as described by P. Zelenay, S. C. Thomas, S. Gottesfeld in S. Gottesfeld, T. F. Fuller "Proton Conducting Membrane Fuel Cells II" ECS Proc. Vol. 98-27pp. 300-308.

Possible areas of use for the inventive polymer membranes include, inter alia, application in fuel cells, in electrolysis, in capacitors and in battery systems. Because of the profile of their characteristics polymer membranes are preferably used in fuel cells.

The present invention also concerns a membrane-electrode assembly, which has at least one inventive polymer membrane. The membrane-electrode assembly has a high operating efficiency, even with a low content of catalytically active substances, such as platinum ruthenium or palladium. Gas diffusion layers with a catalytically active coating can be used for this.

The gas diffusion layer generally demonstrates electron conductivity. Planar, electrically conducting and acid-resistant formations are normally used for this. These include, for example, carbon fibre paper, graphitised carbon fibre paper, carbon fibre fabric, graphitised carbon fibre fabric and/or planar formations which are rendered conductive by addition of carbon black.

The catalytically active layer contains a catalytically active substance. These include, inter alia, noble metals such as platinum, palladium, rhodium, iridium and/or ruthenium. These substances can also be used in the form of alloys with each other. Furthermore, these substances can also be used in alloys with base metals such as Cr, Zr, Ni, Co and/or Ti. In addition, the oxides of the abovementioned noble metals and/or base metals can also be used.

According to a particular aspect of the present invention the catalytically active compounds are used in the form of particles which preferably have a size in the range 1 to 1,000 nm, in particular 10 to 200 nm and preferably 20 to 100 nm.

The catalytically active particles, which the abovementioned substances contain, can be used as metal powder, so-called black noble metal, in particular platinum and/or platinum alloys. Such particles generally have a size in the range 5 nm to 200 nm, preferably in the range 10 nm to 100 nm.

Moreover, the metals can also be used on a base material. The base preferably contains carbon which, in particular, can be used in the form of carbon black, graphite or graphitised carbon black. The metal content of these supported particles, with reference to the total weight of the particles, is generally in the range 1 to 80% by weight, preferably 5 to 60% by weight with a particular preference for 10 to 50% by weight, without this being restrictive. The particle size of the base, in particular the size of the carbon particles, is preferably in the range 20 to 100 nm, in particular 30 to 60 nm. The size of the metal particles present on this is preferably in the range 1 to 20 nm, in particular 1 to 10 nm with a particular preference for 2 to 6 nm.

The sizes of the various particles are means of the average weights and can be determined by transmission electron microscopy.

The catalytically active particles defined above are generally commercially available.

Furthermore the catalytically active layer can contain the normal additives. These include, inter alia, fluoropolymers such as polytetrafluoroethylene (PTFE) and surface-active substances.

The surface-active substances include in particular ionic surfactants, such as fatty acid salts, in particular sodium laurate, potassium oleate; and alkyl sulphonic acids, alkyl sulphonic acid salts, in particular sodium perfluorohexanesulphonate, lithium perfluorohexanesulphonate, ammonium perfluorohexanesulphonate, perfluorohexanesulphonic acid, potassium nonafluorobutanesulphonate and non-ionic surfactants, in particular ethoxylated fatty alcohols and polyethylene glycol.

Particularly preferred additives are fluoropolymers, in particular tetrafluoroethylene polymers. According to a particular embodiment of the present invention the weight ratio between the fluoropolymer and the catalyst material, comprising at least a noble metal and possibly one or more base materials, is greater than 0.1, with this ratio preferably being in the range 0.2 to 0.6.

According to a particular embodiment of the present invention the catalyst layer has a thickness in the range 1 to 1,000 µm, in particular 5 to 500, preferably 10 to 300 µm. This value is an average, which can be determined by measuring the layer thickness in the cross-section of shots obtained using a raster electron microscope (REM).

According to a particular embodiment of the present invention the noble metal content of the catalyst layer is 0.1 to 10.00 mg/cm$^2$, preferably 0.3 to 6.0 mg/cm$^2$ with a particular preference for 0.3 to 3.0 mg/cm$^2$. These values can be determined by elementary analysis of a planar sample.

The production of a membrane-electrode assembly can, inter alia, take place by hot pressing. Here the combination of electrode, comprising gas diffusion layers provided with catalytically active layers, and a membrane is heated to a temperature in the range 50° C. to 200° C. and pressed with a pressure of 0.1 to 5 MPa. In general a few seconds is sufficient to bond the catalyst layer with the membrane. This time is preferably in the range 1 second to 5 minutes, in particular 5 seconds to 1 minute.

The object of the present invention is likewise an inventive proton-conducting polymer membrane coated with a catalyst layer.

Various methods can be used to apply the catalyst layer to the membrane. So, for example, a support can be used which is provided with a coating containing a catalyst in order to provide the inventive membrane with a catalyst layer.

In this case the membrane can be provided with the catalyst layer on one or both sides. If the membrane is provided with a catalyst layer on one side only, the other side of the membrane must be pressed onto an electrode that has a catalyst layer. If both sides of the membrane are provided with a catalyst layer, the following methods can also be used in combination in order to achieve an optimum result.

According to the invention, the catalyst layer can be applied using a method in which a catalyst suspension is used. Furthermore powders containing the catalyst can also be used.

The catalyst suspension contains a catalytically active substance. The substances have been listed above in connection with the catalytically active layer.

Furthermore the catalyst suspension can contain normal additives. These include, inter alia, fluoropolymers such as polytetrafluoroethylene (PTFE), thickening agents, in particular water-soluble polymers such as cellulose derivatives, polyvinylalcohol, polyethyleneglycol, and surface-active substances that have been defined above in connection with the catalytically active layer.

The surface-active substances include in particular ionic surfactants, such as fatty acid salts, in particular sodium laurate, potassium oleate; and alkyl sulphonic acids, alkyl sulphonic acid salts, in particular sodium perfluorohexanesulphonate, lithium perfluorohexanesulphonate, ammonium perfluorohexanesulphonate, perfluorohexanesulphonic acid, potassium nonafluorobutanesulphonate and non-ionic surfactants, in particular ethoxylated fatty alcohols and polyethylene glycol.

Furthermore, the catalyst suspension can contain constituents that are liquid at ambient temperature. These include, inter alia, organic solvents, which can be polar or nonpolar, phosphoric acid, polyphosphoric acid and/or water. The catalyst suspension preferably contains 1 to 99% by weight, in particular 10 to 80% by weight liquid constituents.

The polar, organic solvents include, in particular, alcohols such as ethanol, propanol, isopropanol and/or butanol.

The organic nonpolar solvents include, inter alia, known thin film diluting agents, such as thin film diluting agent 8470 from DuPont, containing gum spirits of turpentine.

Particularly preferred additives are fluoropolymers, in particular tetrafluoroethylene polymers. According to a particular embodiment of the present invention the weight ratio between the fluoropolymer and the catalyst material, comprising at least a noble metal and possibly one or more base materials, is greater than 0.1, with this ratio preferably being in the range 0.2 to 0.6.

The catalyst suspension can be applied to the inventive membrane by the usual methods. Depending on the viscosity of the suspension, which can also be in paste form, a number of methods are known by which the suspension can be applied. Suitable methods are those for coating films, fabrics, textiles and/or papers, in particular spray methods and printing methods such as template or silk-screen printing, ink-jet methods, roller application, in particular screen rolling, slot die application and doctoring. The particular method and the viscosity of the catalyst suspension are dependent upon the hardness of the membrane.

The viscosity can be affected by the proportion of solid matter content, in particular the content of catalytically active particles, and the proposition-of additives. The viscosity to be selected is dependent upon the method of application of the catalyst suspension, the optimum values and determination of these being familiar to the person skilled in the art.

Depending on the hardness of the membrane an improvement in the bonding between the catalyst and the membrane can be achieved by heating and/or pressing.

According to a particular aspect of the present invention the catalyst layer is applied using a powder method. In this case a catalyst powder is used which can also contain additives which have been defined above by way of example.

In order to apply the catalyst powder spray and screen methods, inter alia, can be used. With the spray method the powder mixture is sprayed via a nozzle, for example a slot die, onto the membrane. Generally the membrane with the catalyst layer applied is then heated in order to improve the bond between the catalyst and the membrane. Heating can, for example, be performed using a hot roller. Such methods and devices for application of the powder are described, inter alia, in DE 195 09 748, DE 195 09 749 and DE 197 57 492.

With the screen method the catalyst powder is applied to the membrane using a vibrating screen. A device for applying a catalyst powder to a membrane is described in WO 00/26982. Following the application of the catalyst powder the bond between catalyst and membrane can be improved by heating. In this case the membrane provided with at least a catalyst layer can be heated to a temperature in the range 50 to 200° C., in particular 100 to 180° C.

Moreover, the catalyst layer can be applied using a method in which a coating containing a catalyst is applied to a carrier and then the coating containing a catalyst on the carrier is transferred to the inventive membrane. Such a method is described, by way of example, in WO 92/15121.

The carrier provided with a catalyst coating can, for example, be produced by producing a catalyst suspension as described above. This catalyst suspension is then applied to a carrier film, for example in polytetrafluoroethylene. Following the application of the suspension the volatile constituents are removed.

The transfer of the coating containing a catalyst can take place, inter alia, by hot pressing. Here the combination comprising a catalyst layer and a membrane as well as a carrier film is heated to a temperature in the range 50° C. to 200° C. and pressed with a pressure of 0.1 to 5 MPa. In general a few seconds is sufficient to bond the catalyst layer with the membrane. This time is preferably in the range 1 second to 5 minutes, in particular 5 seconds to 1 minute.

According to a particular embodiment of the present invention the catalyst layer has a thickness in the range 1 to 1,000 μm, in particular 5 to 500, preferably 10 to 300 μm. This value is an average, which can be determined by measuring the layer thickness in the cross-section of shots obtained using a raster electron microscope (REM).

According to a particular embodiment of the present invention the membrane provided with at least one catalyst layer contains 0.1 to 10.00 mg/cm$^2$, preferably 0.3 to 6.0 mg/cm$^2$ with a particular preference for 0.3 to 3.0 mg/cm$^2$. These values can be determined by elementary analysis of a planar sample.

Following the coating with a catalyst the membrane obtained can be cross-linked thermally, photochemically, chemically and/or electrochemically. This hardening of the membrane further improves the properties-of the membrane. Here the membrane can be heated to a temperature of at least 150° C., preferably at least 200° C. with a particular preference for at least 250° C. According to a particular embodiment the cross-linking preferably takes place in the presence of oxygen. The acid concentration in this step of the process is normally in the range 5 to 50% by volume, preferably 10 to 40% by volume, without this being restrictive.

The cross-linking can also take place under the effect of IR or NIR (IR=infrared, i.e. light with a wavelength of more than 700 nm; NIR=near infrared, i.e. light with a wavelength in the range approx. 700 to 2,000 nm or an energy in the range approx. 0.6 to 1.75 eV) and/or UV-light. Another method is irradiation with β-, γ- and/or electron radiation. The radiation dose in this case is preferably between 5 and 200 kGy, in particular between 10 and 100 kGy. The irradiation can be performed in air or under an inert gas. This improves the usage properties of the membrane, in particular the durability.

Depending on the desired degree of cross-linking the duration of the cross-linking reaction can fall within a wide range. In general the reaction time is in the range from 1 second to 10 hours, preferably 1 minute to 1 hour, without this being restrictive.

The inventive polymer membrane with catalyst coating has improved material properties compared with the previously known doped polymer membranes. In particular, they perform better than known doped polymer membranes. This is due, in particular, to a better contact between membrane and catalyst.

In order to produce a membrane-electrode assembly the inventive membrane can be bonded to a gas diffusion layer. If the membrane is provided with a catalyst layer on both sides, the gas diffusion layer must not comprise any catalyst prior to pressing.

An inventive membrane-electrode assembly has a surprisingly high power density. According to a particular embodiment preferred membrane-electrode assemblies provide a current density of at least 0.1 A/cm$^2$, preferably 0.2 A/cm$^2$ with a particular preference for 0.3 A/cm$^2$. This current density is measured during operation with hydrogen at the anode and air (approx. 20% by volume oxygen, approx. 80% by volume nitrogen) at the cathode under normal pressure (absolute 1,013 mbar, with open cell output) and 0.6V cell voltage. In this case particularly high temperatures in the range 150-200° C., preferably 160-180° C., in particular 170° C., can be used.

The abovementioned power densities can also be achieved at low stoichiometry of the combustion gas on both sides. According to a particular aspect of the present invention the stoichiometry is less than or equal to 2, preferably less than or equal to 1.5 with a quite particular preference for less than or equal to 1.2.

According to a particular embodiment of the present invention the catalyst layer has a low noble metal content. The noble metal content of a preferred catalyst layer, which an inventive membrane contains, is preferably a maximum of 2 mg/cm$^2$, in particular a maximum of 1 mg/cm$^2$ with a quite particular preference for a maximum of 0.5 mg/cm$^2$. According to a particular aspect of the present invention one side of a membrane has a higher metal content than the other side of the membrane. The metal content of one side is preferably double the metal content of the other side.

In a further variant a catalytically active layer can be applied to the inventive membrane and bonded to this with a gas diffusion layer. For this a membrane is formed in accordance with steps A) and B) and the catalyst is applied. In a variant the catalyst can be applied before or together with the starter solution. These formations are also an object of the present invention.

Moreover, the formation of the membrane in accordance with steps A) and B) can also take place on a carrier or a carrier film which already has the catalyst. Following removal of the carrier or the carrier film, the catalyst is located on the inventive membrane. These formations are also an object of the present invention.

Also an object of the present invention is a membrane-electrode assembly which contains at least an inventive polymer membrane if necessary in combination with another polymer membrane with a polyazole base or a polymer blend membrane.

Possible areas of use for the inventive polymer membranes include, inter alia, use in fuel cells, in electrolysis, in capacitors and in battery systems. Because of the profile of their characteristics polymer membranes are preferably used in fuel cells.

EXAMPLES 1 AND 2

A film in high molecular weight polybenzimidazole, which has been produced from a PBI-DMAc solution in accordance with DE 10052237.8 and by selection of suitable polymer granulate in accordance with DE 10129458.1, is inserted in a solution comprising 10 parts by weight of vinyl phosphonic acid (97%) available from Clariant and one part by weight of an aqueous solution containing 5 per cent by weight of 2,2'-azo-bis-(isobutyric acid amidine)-dihydroxychloride. After various insertion times samples are taken and these are then treated in the oven at 80° C. for 1 hour. The membrane obtained in this way has the conductivity at 160° C. determined by means of impedance spectroscopy. The mechanical properties (modulus of elasticity, hardness (HU) and creep Cr) were determined after thermal treatment by micro-hardness measurement. For this the membrane is successively stressed with a Vickers diamond for 20 seconds at up to a force of 3 nM and the penetration depth is determined. Then the force is kept constant for 5 seconds at 3 mN and the creep from the penetration depth is calculated. The properties of these membranes are summarised in Table 1.

TABLE 1

Properties of PBI films following expansion with vinyl phosphonic acid-containing solution at ambient temperature

| | Insertion time [h] | Conductivity @ 160° C. [mS/cm] | HU [MPa] | Modulus of elasticity [MPa] | Cr [%] |
|---|---|---|---|---|---|
| Ex. 1 | 3 | 1.5 | 3 | 72.5 | 3.3 |
| Ex. 2 | 22 | 10.7 | 1.7 | 37.6 | 4.3 |

EXAMPLES 3 TO 5

A film in a high molecular weight polybenzimidazole, which has been produced from a PBI-DMAc solution in accordance with DE 10052237.8 and by selection of suitable polymer granulate in accordance with DE 10129458.1, is initially washed at 45° for 30 minutes as described in DE101 10752.8. Then excess water is dabbed from the PBI film pre-treated in this way using a paper cloth. This un-doped PBI film is then placed in a solution comprising 10 parts by weight vinyl phosphonic acid (97%) available from Clariant and one part by weight of an aqueous solution containing 5 per cent by weight of 2,2'-azo-bis-(isobutyric acid amidine)-dihydroxychloride at 45°. Next, after various insertion times, the increase in weight, the increase in thickness and the increase in area are determined. Then the membrane is treated in the oven at 80° C. for 1 hour. The membrane obtained in this way has the conductivity at 160° C. determined by means of impedance spectroscopy. The properties of these membranes are summarised in Table 2.

TABLE 2

Properties of washed doped PBI films following expansion with vinyl phosphonic acid-containing solution at increased temperature

| | Insertion time [h] | Insertion temp. [° C.] | Increase in thickness [%] | Increase in area [%] | Increase in weight [%] | Conductivity @ 160° C. [mS/cm] |
|---|---|---|---|---|---|---|
| Ex. 3 | 1 | 45 | 118 | 51 | 175 | 4.7 |
| Ex. 4 | 4 | 45 | 133 | 110 | 525 | 16.4 |
| Ex. 5 | 22 | 45 | 164 | 156 | 712 | 26.6 |

Elementary analyses were performed on the samples from examples 4 and 5, the results of which are presented in Table 2a.

TABLE 2a

| | wt % C | wt % H | wt % O | wt % N | wt % P | n(P)/n(N) |
|---|---|---|---|---|---|---|
| Ex. 4 | 27.9 | 5.2 | 43 | 1.6 | 21.4 | 6.04 |
| Ex. 5 | 26.6 | 5.15 | 42.5 | 1.7 | 23.3 | 6.19 |

The mechanical properties (modulus of elasticity, hardness (HU) and creep Cr) were determined after thermal treatment by micro-hardness measurement, and the results obtained are presented in Table 2b.

TABLE 2b

| | HU [MPa] | Modulus of elasticity [MPa] | Cr [%] |
|---|---|---|---|
| Ex. 4 | 0.42 | 8.4 | 2.1 |
| Ex. 5 | 0.5 | 15.3 | 4.1 |

EXAMPLES 6 TO 9

A film in a high molecular weight polybenzimidazole, which has been produced from a PBI-DMAc solution in accordance with DE 10052237.8 and by selection of suitable polymer granulate in accordance with DE 10129458.1, is initially washed at 45° for 30 minutes as described in DE1 0110752.8. Then excess water is dabbed from the PBI film pre-treated in this way using a paper cloth. This un-doped PBI film is then placed in a solution comprising 1 part by weight water and 10 parts by weight vinyl phosphonic acid (97%) available from Clariant at 60° C. for 2 hours. The PBI film pre-expanded in this way is then placed for 24 hours at ambient temperature in a solution comprising 10 parts by weight vinyl phosphonic acid (97%) available from Clariant and one part by weight of an aqueous solution containing 0.1-5 per cent by weight of 2,2'-azo-bis-(isobutyric acid amidine)-dihydroxychloride, the concentrations from the examples being presented in Table 3. The increase in thickness and increase in area are then determined. Then the membrane is treated in the oven at 80° C. for 1 hour and the increase in weight is determined. The membrane obtained in this way has the conductivity at 160° C. determined by means of impedance spectroscopy. The properties of these membranes are summarised in Table 3.

TABLE 3

Properties of washed doped PBI films following expansion with vinyl phosphonic acid-containing solution and differing concentrations of the starter 2,2'- azo-bis-(isobutyric acid amidine)-dihydroxychloride.

| | Starter concentration [%] | Increase in thickness [%] | Increase in area [%] | Increase in weight [%] | Conductivity @ 160° C. [mS/cm] |
|---|---|---|---|---|---|
| Ex. 6 | 0.01 | 145 | 143 | 589 | 13.9 |
| Ex. 7 | 0.1 | 138 | 150 | 522 | 14.0 |
| Ex. 8 | 1 | 162 | 144 | 574 | 14.4 |
| Ex. 9 | 5 | 142 | 129 | 503 | 12.5 |

The mechanical properties (modulus of elasticity, hardness (HU) and creep Cr) were determined after thermal treatment by micro-hardness measurement, and the data obtained are presented in Table 3a.

TABLE 3a

| | HU [MPa] | Modulus of elasticity [MPa] | Cr [%] |
|---|---|---|---|
| Ex. 6 | 0.5 | 10.4 | 3.1 |
| Ex. 7 | 0.36 | 7.5 | 2.5 |
| Ex. 8 | 0.42 | 8 | 2.7 |
| Ex. 9 | 0.7 | 13.7 | 2.9 |

EXAMPLES 10 TO 14

A film in a high molecular weight polybenzimidazole, which has been produced from a PBI-DMAc solution in accordance with DE 10052237.8 and by selection of suitable polymer granulate in accordance with DE 10129458.1, is initially washed at 45° for 30 minutes as described in DE101 10752.8. Then excess water is dabbed from the PBI film pre-treated in this way using a paper cloth. This un-doped PBI film is then placed in a solution comprising 1 part by weight water and 10 parts by weight vinyl phosphonic acid (97%) available from Clariant at 80° C. for between 1.5 and 2.5 hours. The PBI film pre-expanded in this way is then placed for 24 hours at ambient temperature in a solution comprising 10 parts by weight vinyl phosphonic acid (97%) available from Clariant and one part by weight of an aqueous solution containing 0.1 per cent by weight 2,2'-azo-bis-(isobutyric acid amidine)-dihydroxychloride. The increase in thickness and increase in area are then determined. Then the membrane is treated in the oven at 80° C. for 1 hour and the increase in weight is determined. The membrane obtained in this way has the conductivity at 160° C. determined by means of impedance spectroscopy. The properties of these membranes are summarised in Table 4. The mechanical properties of this membrane with a weight increase of between 500 and 600 wt % vary between 0.4 and 0.7 MPa for the HU hardness (HU), 7 and 14 MPa for the modulus of elasticity and 2 and 4% for the creep.

TABLE 4

Properties of washed doped PBI films following expansion with vinyl phosphonic acid-containing solution and the same production method

| | Increase in thickness [%] | Increase in area [%] | Increase in weight [%] | Conductivity @ 160° C. [mS/cm] |
|---|---|---|---|---|
| Ex. 10 | 142 | 150 | 600 | — |
| Ex. 11 | 143 | 113 | 503 | 15.3 |
| Ex. 12 | 142 | 143 | 560 | 18.6 |
| Ex. 13 | 148 | 124 | 545 | 16.7 |
| Ex. 14 | 149 | 135 | 560 | 19.4 |

EXAMPLE 15

A film in polybenzimidazole, which has been produced from a PBI-DMAc solution in accordance with DE 10052237.8 and by addition of a cross-linker and a blend component in accordance with DE 10140147.7, is initially washed at 45° for 30 minutes as described in DE10110752.8. Then excess water is dabbed from the PBI film pre-treated in this way using a paper cloth. This un-doped PBI film is then placed in a solution comprising 1 part by weight water and 10 parts by weight vinyl phosphonic acid (97%) available from Clariant at 70° C. for 3 hours. The PBI film pre-expanded in this way is then placed for 24 hours at ambient temperature in a solution comprising 10 parts by weight vinyl phosphonic acid (97%) available from Clariant and one part by weight of an aqueous solution containing 0.1 per cent by weight 2,2'-azo-bis-(isobutyric acid amidine)-dihydroxychloride. The increase in thickness and increase in area are then determined. Then the membrane is treated in the oven at 80° C. for 1 hour and the increase in weight is determined. The membrane obtained in this way has the conductivity at 160° C. determined by means of impedance spectroscopy. The properties of these membranes are summarised in Table 5.

TABLE 5

Properties of a high-strength PBI membrane following expansion with vinyl phosphonic acid-containing solution

| | Increase in thickness [%] | Increase in area [%] | Increase in weight [%] | Conductivity @ 160° C. [mS/cm] |
|---|---|---|---|---|
| Ex. 15 | 94 | 170 | 307 | 17 |

The mechanical properties of such a membrane were determined by micro-hardness measurement. The membrane has a hardness (HU) of 1.2 N/mm$^2$, a modulus of elasticity, Y, of 28 MPa and a creep, Cr, of 9.5%.

EXAMPLES 16 TO 19

A film in a high molecular weight polybenzimidazole, which has been produced from a PBI-DMAc solution in accordance with DE 10052237.8 and by selection of suitable polymer granulate in accordance with DE 10129458.1, is initially washed at 45° for 30 minutes as described in DE10110752.8. Then excess water is dabbed from the PBI film pre-treated in this way using a paper cloth. This un-doped PBI film is then placed in a solution comprising 1 part by weight water and 10 parts by weight vinyl phosphonic acid (97%) available from Clariant at 70° C. for 2 hours. The PBI film pre-expanded in this way is then placed for 24 hours at ambient temperature in a solution comprising 10 parts by weight vinyl phosphonic acid (97%) available from Clariant and 0.1-2% N,N'-methylenebisacrylamide and one part by weight of an aqueous solution containing 0.1 per cent by weight 2,2'-azo-bis-(isobutyric acid amidine)-dihydroxychloride. The increase in thickness and increase in area are then determined. Then the membrane is treated in the oven at 130° C. for 3 hours and the increase in weight is determined. The membrane obtained in this way has the conductivity at 160° C. determined by means of impedance spectroscopy. The properties of these membranes are summarised in Table 6.

TABLE 6

Properties of a high-strength PBI membrane following expansion with vinyl phosphonic acid-containing solution containing various cross-linker concentrations

| | Cross-linker concentration [wt %] | Increase in thickness [%] | Increase in area [%] | Increase in weight [%] | Conductivity @ 160° C. [mS/cm] |
|---|---|---|---|---|---|
| Ex. 16 | 0.1 | 145 | 131 | 472 | 16.6 |
| Ex. 17 | 0.5 | 151 | 137 | 489 | 15.2 |
| Ex. 18 | 1 | 145 | 131 | 481 | 16.3 |
| Ex. 19 | 2 | 128 | 119 | 463 | 15.1 |

The mechanical properties of these samples were determined by micro-hardness measurement. The results are summarised in Table 6a.

TABLE 6a

| Sample No. | Cross-linker concentration [wt %] | Modulus of elasticity [MPa] | HU [MPa] | Cr [%] |
|---|---|---|---|---|
| Ex. 16 | 0.1 | 9.1 | 0.43 | 2.4 |
| Ex. 17 | 0.5 | 11.2 | 0.57 | 2.2 |
| Ex. 18 | 1 | 9.1 | 0.48 | 2.6 |
| Ex. 19 | 2 | 12.2 | 0.58 | 2.6 |

EXAMPLES 20 TO 23

A film in a high molecular weight polybenzimidazole, which has been produced from a PBI-DMAc solution in accordance with DE 10052237.8 and by selection of suitable polymer granulate in accordance with DE 10129458.1, is initially washed at 45° for 30 minutes as described in DE10110752.8. Then excess water is dabbed from the PBI film pre-treated in this way using a paper cloth. This un-doped PBI film is then placed in a solution comprising 1 part by weight water and 10 parts by weight vinyl phosphonic acid (97%) available from Clariant at 70° C. for 2 hours. The increase in thickness and increase in area are then determined. The membrane is then treated by electron irradiation and with a radiation dose of 33-200 kGy. The membrane obtained in this way has the conductivity at 160° C. determined by means of impedance spectroscopy. The properties of these membranes are summarised in Table 7b.

TABLE 7

Properties of vinyl phosphonic acid containing PBI membranes prior to electron irradiation

| Example | Increase in thickness [%] | Increase in area [%] |
|---|---|---|
| 20 | 139 | 130 |
| 21 | 139 | 130 |
| 22 | 145 | 130 |
| 23 | 138 | 150 |

The mechanical properties of these samples were determined by micro-hardness measurement. The results are summarised in Table 7a.

TABLE 7a

| Example | Irradiation dose [kGy] | Conductivity @ 160° C. [mS/cm] | Modulus of elasticity [MPa] | HU [MPa] | Cr [%] |
|---|---|---|---|---|---|
| 20 | 33 | 9.5 | 370 | 9 | 5.5 |
| 21 | 66 | 3.7 | 70 | 3.9 | 6.1 |
| 22 | 99 | 2 | 1880 | 39.2 | 7.1 |
| 23 | 200 | 1 | 139 | 8.3 | 7.3 |

In order to determine the content of acid that can be washed away the irradiated membranes are in a first stage placed in water at ambient temperature, agitated for 10 minutes, and the acid released is determined following removal of the membrane by titration from the consumption with 0.1 molar caustic soda up to the second titration point. In a second stage, the membrane sample is treated in a beaker with boiling water for 30 minutes. The acid thereby released is again determined by means of titration from the consumption with 0.1 molar caustic soda up until the second titration point. In a third stage, the membrane pre-treated in this way is again treated for 30 minutes with boiling water and the acid thereby released is again determined by means of titration. The results are obtained are presented in Table 7b. If this procedure is performed with a non-irradiated membrane from examples 10 to 14, then the consumption of 0.1 molar caustic soda up until the second end point in the first stage is 28-36 ml, in the second stage less than 2 ml and in the third stage less than 0.2 ml.

TABLE 7b

| Example | Irradiation dose [kGy] | V(0.1 M NaOH) after stage 1 [ml] | V(0.1 M NaOH) after stage 2 [ml] | V(0.1 M NaOH) after stage 3 [ml] |
|---|---|---|---|---|
| 20 | 33 | 16.1 | 0.04 | 0 |
| 21 | 66 | 15.0 | 0.09 | 0.04 |
| 22 | 99 | 11.2 | 0.3 | 0.08 |
| 23 | 200 | 6.8 | 0.5 | 0.3 |

EXAMPLE 24

A membrane-electrode assembly is produced by pressing a membrane from example 11 and 2 electrodes with a Pt content of 1 mg/cm² at the anode and 2 mg/cm² at the cathode. A temperature of 140° C., a pressing time of 30 s and a pressure of 4 N/mm² are selected for the pressing. An MEA produced in this way with an active surface area of 10 cm² is operated without humidification in a single cell at 160° C. After 16 hours of operation a hydrogen flow of 5.7 l/h and an air flow of 22.5 l/h the following performance data are produced at an absolute pressure $p_a$ of 1 bar and 2 bar.

TABLE 9

Performance data for an MEA in accordance with example 23

| $p_a$ [bar] | I [A/cm²] | 0 | 0.1 | 0.2 | 0.3 | 0.4 | 0.5 | 0.6 | 0.7 | 0.8 | 0.9 | 1 | 1.1 |
|---|---|---|---|---|---|---|---|---|---|---|---|---|---|
| 1 | U [mV] | 855 | 731 | 682 | 644 | 612 | 582 | 552 | 522 | 487 | 451 | 408 | 351 |
| 2 | U [mV] | 890 | 770 | 726 | 695 | 668 | 644 | 620 | 596 | 570 | 543 | 514 | 480 |

EXAMPLE 25

A membrane-electrode assembly is produced by pressing a membrane irradiated with 66 kGy from example 21 and 2 electrodes with a Pt/Ru content of 1.5 mg/cm² at the anode and 4 mg/cm² Pt black at the cathode. A temperature of 120° C., a pressing time of 30 s and a force of 5 kN are selected for the pressing. An MEA produced in this way with an active surface area of 30 cm² is initially maintained at 90° C. with 0.5 molar methane solution and a flow of 20 ml/min for 16 hours at equilibrium rest potential. The methanol crossover is measured by means of a $CO_2$ sensor at the cathode output. The methanol crossover is 70 mA/cm² compared with 100 mA/cm² for an identical cell containing a Nafion 117 membrane. The cell resistance is 355 mOhm*cm² compared with 144 mOhm*cm² for an identical cell containing a Nafion 117 membrane. The equilibrium rest potential is 780 mV compared with 730 mV for an identical cell containing a Nafion 117 membrane. Then the following performance data are obtained with this direct-methanol-cell.

TABLE

| Performance data for a direct-methanol-cell at 90° with 0.5 M MeOH. | | | | | | | | | |
|---|---|---|---|---|---|---|---|---|---|
| $p_a$ [bar] | I [A/cm²] | 0 | 0.02 | 0.06 | 0.08 | 0.1 | 0.2 | 0.3 | 0.4 |
| 3 | U [V] | 0.78 | 0.65 | 0.595 | 0.56 | 0.53 | 0.45 | 0.39 | 0.28 |

EXAMPLE 26

A membrane-electrode assembly is produced by pressing a membrane from example 11 and 2 electrodes with a Pt content of 1 mg/cm² at the anode and 2 mg/cm² at the cathode. A temperature of 140° C., a pressing time of 30 s and a pressure of 4 N/mm² are selected for the pressing. The active surface area is 30 cm². An MEA produced in this way is then treated with electron irradiation and an irradiation dose of 99 kGy. An MEA produced in this way with an active surface area of 30 cm² is initially maintained at 90° C. with 0.5 molar methane solution and a flow of 20 ml/min for 16 hours at equilibrium rest potential. The methanol crossover is measured by means of a $CO_2$ sensor at the cathode output. The methanol crossover is 9 mA/cm². The cell resistance is 944 mOhm*cm². The equilibrium rest potential is 750 mV. After 1 hour's operation at 0.2 A/cm² with a 0.5 M MeOH solution at 90° C. the cell is operated with a 10 M MeOH solution. In operation with 10 M MeOH solution at 90° C. and a flow of 20 ml/min the methanol crossover is 90 mA/cm² and the equilibrium rest potential is 610 mA/cm². After 1 hour of operation with 10 M MeOH the cell is again operated with 0.5 M MeOH solution and identical results are obtained for equilibrium rest potential, cell resistance and methanol crossover as at the start of the measurement.

EXAMPLE 27

A film in a high molecular weight polybenzimidazole, which has been produced from a PBI-DMAc solution in accordance with DE 10052237.8 and by selection of suitable polymer granulate in accordance with DE 10129458.1, is initially washed at 45° for 30 minutes as described in DE10110752.8. Then excess water is dabbed from the PBI film pre-treated in this way using a paper cloth. The un-doped PBI film is then placed in a solution containing 50 g vinyl phosphonic acid (97%) available from Clariant, 4.463 g bisphenol-A epoxy diacrylate (CN-120 from Sartomer Inc.) and 2 g 1-hydroxycyclohexyl phenyl ketone (Irgacure 184 from Ciba-Geigy) for 2 hours at 70° C. in a darkened chamber. The membrane expanded in this way is placed between 2 paper cloths and rolled 10 times with a cylinder weighing 250 g.

The film is then placed between 2 transparent films of oriented polypropylene and excess air is removed by repeated rolling as described above. This laminate is then transferred to a chamber where each side is irradiated for 1 minute with a 300 W mercury arc lamp of the H3T7 type from General Electric and this process is repeated once. The polypropylene film is carefully removed from the membrane. This process is made easier by gentle heating using a hot-air oven. A typical weight increase following this treatment is 500 wt %.

The invention claimed is:

1. A proton-conducting electrolyte membrane obtained by a method comprising the steps:
   a) expanding a polymer film with a liquid that contains a vinyl-containing phosphonic acid, and
   b) polymerizing the vinyl-containing phosphonic acid present in the liquid of step a), wherein
      the product obtained in step (a) includes at least 50% by weight of vinyl-containing phosphonic acid; and
      the intrinsic conductivity of the inventive membrane at temperatures of 160° C. is at least 0.001 S/cm wherein this value is achieved without humidification and
   wherein the polyvinyl containing phosphonic acid formed in step b) forms an inter-penetrating network with the polymer of the polymer film from step a).

2. The membrane of claim 1, characterized in that the polymers used in step a) are high-temperature stable polymers which contain at least one nitrogen, oxygen, or sulphur atom in one or more recurring units.

3. The membrane of claim 1, characterized in that the liquid containing the vinyl-containing phosphonic acid contains compounds of the formula

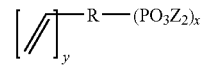

in which
R denotes a bond, a C1-C15 alkyl group, C1-C15 alkoxy group, ethyleneoxy group, C5-C20 aryl or heteroaryl group, and the abovementioned radicals are optionally substituted by halogen, —OH, COOZ, —CN, $NZ_2$
Z independently of each other denotes hydrogen, a C1-C15 alkyl group, C1-C15 alkoxy group, ethyleneoxy group, C5-C20 aryl or heteroaryl group, and the abovementioned radicals are optionally substituted by halogen, —OH, COOZ, —CN, $NZ_2$ and
x denotes a whole number 1, 2, 3, 4, 5, 6, 7, 8, 9 or 10
y denotes a whole number 1, 2, 3, 4, 5, 6, 7, 8, 9 or 10 or the formula

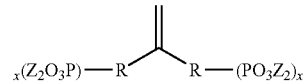

in which
R denotes a bond, a C1-C15 alkyl group, C1-C15 alkoxy group, ethyleneoxy group, C5-C20 aryl or heteroaryl group, and the abovementioned radicals are optionally substituted by halogen, —OH, COOZ, —CN, $NZ_2$, Z independently of each other denotes hydrogen, a C1-C15 alkyl group, C1-C15 alkoxy group, ethyleneoxy group, C5-C20 aryl or heteroaryl group, and the abovementioned radicals are optionally substituted by halogen, —OH, COOZ, —CN, $NZ_2$, and x denotes a whole number 1, 2, 3, 4, 5, 6, 7, 8, 9 or 10, or the formula

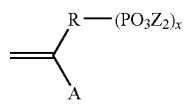

in which

A represents a group of formula $COOR^2$, CN, $CONR^2{}_2$, $OR^2$, or $R^2$, in which $R^2$ denotes hydrogen, a C1-C15 alkyl group, C1-C15 alkoxy group, ethyleneoxy group, or C5-C20 aryl or heteroaryl group, and the abovementioned radicals are optionally substituted by halogen, —OH, COOZ, —CN, $NZ_2$, R denotes a bond, a bivalent C1-C15 alkylene group, bivalent C1-C15 alkyleneoxy group, and the abovementioned radicals are optionally substituted by halogen, —OH, COOZ, —CN, $NZ_2$, Z independently of each other denotes hydrogen, a C1-C15 alkyl group, C1-C15 alkoxy group, ethyleneoxy group, or C5-C20-aryl or heteroaryl group, and the abovementioned radicals are optionally substituted by halogen, —OH, COOZ, —CN, $NZ_2$, and x denotes a whole number 1, 2, 3, 4, 5, 6, 7, 8, 9 or 10.

4. The membrane of claim 1, characterized in that the liquid containing the vinyl-containing phosphonic acid contains at least one substance that is capable of radical formation.

5. The membrane of claim 1, characterized in that the polymerization of step c) takes place by irradiation with IR light, NIR light, UV light, β-radiation, γ-radiation, or electron radiation.

6. The membrane of claim 1, characterized in that the membrane has an intrinsic conductivity of at least 20 mS/cm and without humidification.

7. The membrane of claim 1, characterized in that the membrane contains between 0.5% and 95% by weight of polymer and between 10% and 99.5% by weight polyvinyl-containing phosphonic acid.

8. The membrane of claim 1, characterized in that the membrane has a layer containing a catalytically active component.

9. A proton-conducting electrolyte membrane obtained by a method comprising the steps:
 a) expanding a polymer film with a liquid that contains a vinyl-containing phosphonic acid, and
 b) polymerizing the vinyl-containing phosphonic acid present in the liquid of step a),
  wherein the product obtained in step (a) includes at least 70% by weight of vinyl-containing phosphonic acid; and
  the intrinsic conductivity of the inventive membrane at temperatures of 160° C. is at least 0.001 S/cm cm wherein this value is achieved without humidification and
wherein the polyvinyl containing phosphonic acid formed in step b) forms an inter-penetrating network with the polymer of the polymer film from step a).

* * * * *